United States Patent
Shiono et al.

(10) Patent No.: US 6,834,036 B1
(45) Date of Patent: Dec. 21, 2004

(54) OPTICAL HEAD FOR A PLURALITY OF TYPES OF INFORMATION RECORDING MEDIA

(75) Inventors: Teruhiro Shiono, Osaka (JP); Keiichi Matsuzaki, Ikeda (JP); Tetsuo Saimi, Hirakata (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/428,837

(22) Filed: Oct. 28, 1999

(30) Foreign Application Priority Data

Oct. 28, 1998 (JP) ............................................ 10-307442
Jun. 17, 1999 (JP) ............................................ 11-171128

(51) Int. Cl.[7] .............................................. G11B 7/00
(52) U.S. Cl. .................................. 369/112.03; 369/121
(58) Field of Search ....................... 369/112.03, 112.04, 369/112.05, 112.23, 112.25, 121

(56) References Cited

U.S. PATENT DOCUMENTS

| | | | |
|---|---|---|---|
| 5,696,750 A | * 12/1997 | Katayama | 369/112.06 |
| 5,838,497 A | 11/1998 | Maruyama | |
| 6,181,668 B1 | * 1/2001 | Kajiyama et al. | 369/112.02 |
| 6,201,777 B1 | * 3/2001 | Tsuchiya et al. | 369/53.23 |
| 6,449,237 B1 | * 9/2002 | Yoo et al. | 369/112.05 |

* cited by examiner

Primary Examiner—Paul W. Huber
(74) Attorney, Agent, or Firm—Osha & May L.L.P.

(57) ABSTRACT

An optical head with high light utilization efficiency that includes a diffractive optical element and a light source emitting beams with a plurality of wavelengths that can read plural types of information recording media. A beam emitted from a light source selectively emitting a beam with a first wavelength and a beam with a second wavelength that is approximately twice as long as the first wavelength is collimated into a parallel beam by a diffraction collimator lens, is bent by a mirror for bending an optical path, and then is focused by a diffraction objective lens on an information recording medium. Outgoing light from these diffractive lenses is substantially a second-order diffraction light with respect to the beam with the first wavelength and is substantially a first-order diffraction light with respect to the beam with the second wavelength.

52 Claims, 14 Drawing Sheets

OPTICAL HEAD FOR A PLURALITY OF TYPES OF INFORMATION RECORDING MEDIA

FIELD OF THE INVENTION

The present invention relates to an optical head used in an optical recording/reproducing apparatus. More particularly, the present invention relates to an optical head with high light utilization efficiency that is provided with a diffractive optical element and a light source emitting beams with a plurality of wavelengths and that can read plural types of information recording media.

BACKGROUND OF THE INVENTION

Optical heads are important components for reading signals from optical recording media such as optical disks, for example, compact disks (CDs) and digital video disks (DVDs), and optical card memories. Not only signal detection functions, but also control mechanisms, such as focus servos or tracking servos, are necessary for optical heads to read out signals from an optical recording medium.

Generally, an optical head comprises various optical components such as a light source, a photodetector, a condenser lens (an objective lens), a focusing/tracking error signal detection element, a mirror for bending an optical path, a collimator lens, and the like. A laser beam emitted from a light source is focused on an optical disk by an objective lens. The laser beam focused on the optical disk is reflected and then is detected by the photodetector. Thus, a reproduction signal is read out. In addition, the focusing/tracking error signal detection element controls focusing and tracking, thus enabling signals to be read out stably.

When a diffractive optical element is used as an optical element in the optical head instead of a refraction optical element such as a general lens, prism, or the like, the optical head can be reduced in size, in thickness, and in weight.

The diffractive optical element denotes an optical element that functions by utilizing diffraction phenomenon. The diffractive optical element is characterized in that a corrugated structure having depth equal to a wavelength order are formed on its surface periodically or quasi-periodically or its surface is formed so that refractive index or amplitude is distributed periodically or quasi-periodically. It has been known that when a period of the diffractive optical element is sufficiently large compared to a wavelength of light being incident onto the diffractive optical element, the diffraction efficiency can be increased almost to 100% by forming the diffractive optical element so as to have a cross section of a sawtooth shape.

When the period of the diffractive optical element is sufficiently large compared to the wavelength of light being incident onto the diffractive optical element, however, the diffraction efficiency of the diffractive optical element can reach 100% only with respect to a design wavelength. FIG. 14 shows the relationship between a wavelength normalized by a design wavelength and first-order diffraction efficiency of the diffractive optical element. As can be seen from FIG. 14, the diffraction efficiency decreases gradually as the wavelength deviates from the design value. Therefore, when the diffractive optical element is used in an optical head in which a light source emitting beams with a plurality of wavelengths corresponding to plural types of optical disks is mounted, the diffractive optical element has been required to be designed for each wavelength optimally and to be positioned only in the optical path of a beam with the intended wavelength to increase the light utilization efficiency.

SUMMARY OF THE INVENTION

In one or more embodiments, the present invention aims to solve the aforementioned problem in the conventional technique and to provide an optical head with high light utilization efficiency that includes a diffractive optical element and a light source emitting beams with a plurality of wavelengths for reading plural types of information recording media.

A first configuration of an optical head according to the present invention includes: at least one light source for emitting a beam with a first wavelength and a beam with a second wavelength that is approximately twice as long as the first wavelength; a photodetector; and at least one diffractive optical element provided in optical paths of the beams with the first and the second wavelengths. In the optical head, outgoing light from the diffractive optical element is substantially a second-order diffraction light with respect to the beam with the first wavelength and is substantially a first-order diffraction light with respect to the beam with the second wavelength.

According to the first configuration of the optical head, for example, even when the diffractive optical element is positioned in optical paths of beams with two wavelengths, high diffraction efficiency can be obtained with respect to both the wavelengths, thus obtaining an optical head with excellent optical characteristics.

In the optical head according to the above-mentioned first configuration, it is preferable that the diffractive optical element has a cross section substantially of a sawtooth shape, and with respect to the first wavelength $\lambda_1$, the second wavelength $\lambda_2$, and a refractive index n of a material of the diffractive optical element, the groove depth in the sawtooth shape is substantially in a range between $2\lambda_1/(n-1)$ and $\lambda_2/(n-1)$ in the case of a transmission element, is substantially in a range between $\lambda_1/n$ and $\lambda_2/2n$ in the case of a reflection element onto which beams are incident from a substrate side, and is substantially in a range between $\lambda_1$ and $\lambda_2/2$ in the Do case of a reflection element onto which beams are incident from an air side.

According to this preferable configuration, the highest diffraction efficiency of the diffractive optical element can be obtained, for example, with respect to the beams with the first and the second wavelengths.

In the optical head according to the above-mentioned first configuration, it is preferable that the diffractive optical element is an objective lens for focusing beams on an information recording medium.

According to this preferable configuration, for example, the objective lens can be reduced in thickness and in weight.

In the optical head according to the above-mentioned first configuration, it is preferable that the diffractive optical element is a collimator lens for collimating beams emitted from the light source substantially into parallel beams.

According to this preferable configuration, for example, the collimator lens can be reduced in thickness and in weight.

In the optical head according to the above-mentioned first configuration, it is preferable that the diffractive optical element is a focusing/tracking error signal detection element.

According to this preferable configuration, for example, the focusing/tracking error signal detection element can be reduced in thickness and in weight.

In the optical head according to the above-mentioned first configuration, it is preferable that with respect to the first wavelength $\lambda_1$, a minimum period $\Lambda_{min}$ of the diffractive optical element satisfies a relationship of $\Lambda_{min} \geq 10\lambda_1$.

According to this preferable configuration, for example, the diffractive optical element with a high diffraction efficiency of at least 80% with respect to the beam with the first wavelength can be obtained.

In the optical head according to the above-mentioned first configuration, it is preferable that with respect to the first wavelength $\lambda_1$, a minimum period $\Lambda_{min}$ of the diffractive optical element satisfies a relationship of $\Lambda_{min} \geq 22\lambda_1$.

According to this preferable configuration, for example, the diffractive optical element with a higher diffraction efficiency of at least 90% with respect to the beam with the first wavelength can be obtained.

In the optical head according to the above-mentioned first configuration, it is preferable that a refraction optical element having optical surfaces onto which beams emitted from the light source are incident obliquely is provided in optical paths of the beams with the first and the second wavelengths, and a diffraction angle of light diffracted by the diffractive optical element due to variation in wavelength of the beams emitted from the light source and a refraction angle of light refracted by the refraction optical element are changed in directions that enable them to be canceled out with each other.

According to this preferable configuration, for example, a thin optical head can be obtained and in addition, when a semiconductor laser beam is used as a beam emitted from the light source, an excellent focusing spot can be obtained on an optical disk surface even when a central wavelength of the beam emitted from the light source is varied according to the broadening of a wavelength range of about several nm due to a high-frequency module or self-oscillation or the change in environmental temperature.

In the above-mentioned preferable configuration, it is further preferable that the diffractive optical element is a grating with a uniform period.

According to this further preferable configuration, for example, positioning and manufacture of the diffractive optical element can be facilitated.

In the above-mentioned preferable configuration, it is further preferable that the diffractive optical element is positioned in a converging light optical path or a diverging light optical path with a numerical aperture of 0.39 or less, and the diffractive optical element has a uniform period.

According to this further preferable configuration, for example, positioning and manufacture of the diffractive optical element can be facilitated.

In the above-mentioned preferable configuration, it is further preferable that the refraction optical element is a prism with three optical surfaces, and when in the three optical surfaces, a surface on a side of an information recording medium is a first surface, a surface on a side of the light source is a second surface, and a surface other than those is a third surface, the refraction optical element is designed so that the beams emitted from the light source pass through the second surface, are reflected by the first and the third surfaces sequentially, and then pass through the first surface, and a bottom part of an objective lens is located lower than a highest position of the beams entering the second surface that have been emitted from the light source.

According to this further preferable configuration, for example, the optical head can be reduced in thickness.

In the above-mentioned further preferable configuration, it is still preferable that a glass material of the prism has an Abbe number of at least 64.

According to this still preferable configuration, for example, manufacture of the diffractive optical element can be facilitated due to the enlargement in period of the diffractive optical element and high diffraction efficiency can be obtained and the influence of variation in wavelength can be cancelled out in a wide wavelength range, thus obtaining an excellent focusing spot on an optical disk surface.

In the above-mentioned first configuration, it is preferable that the light source is an SHG light source that emits beams with two wavelengths.

According to this preferable configuration, for example, a light source for emitting a beam with a first wavelength and a beam with a second wavelength that is approximately twice as long as the first wavelength can be obtained.

In the above-mentioned first configuration, it is preferable that a transparent substrate in which the beams with the first and the second wavelengths propagate in a zigzag manner is provided and the diffractive optical element is positioned on the transparent substrate.

According to this preferable configuration, for example, a thin optical head with a stable structure can be obtained.

In the above-mentioned first configuration, it is preferable that the first wavelength $\lambda_1$ satisfies a relationship of 0.35 $\mu m \leq \lambda_1 \leq 0.44$ $\mu m$ or the second wavelength $\lambda_2$ satisfies a relationship of 0.76 $\mu m \leq \lambda_2$ 0.88 $\mu m$.

According to this preferable configuration, for example, a small focusing spot can be obtained, and high-density disks, for example, with at least 10 GByte capacity or optical disks such as CDs and CD-Rs can be read.

In the above-mentioned first configuration, it is preferable that the first wavelength $\lambda_1$ satisfies substantially a relationship of 0.35 $\mu m \leq \lambda_1 \leq 0.44$ $\mu m$, and the diffractive optical element is a chromatic-aberration compensation element for compensating chromatic aberration caused by an objective lens for focusing beams on an information recording medium.

According to this preferable configuration, for example, an excellent focusing spot can be obtained on an optical disk surface by compensating great chromatic aberration caused by the objective lens when a semiconductor laser beam with a wavelength in a range of 0.35 $\mu m \leq \lambda_1 \leq 0.44$ $\mu m$ in which great chromatic dispersion is caused by the glass material of a lens is used as a beam emitted from the light source, even when a central wavelength of the beam emitted from the light source is varied according to the broadening of a wavelength range of about several nm due to a high-frequency module or self-oscillation or the change in environmental temperature.

A second configuration of an optical head according to the present invention includes: at least one light source for emitting a beam with a first wavelength and a beam with a second wavelength that is approximately twice as long as the first wavelength; a photodetector; an objective lens for focusing beams on an information recording medium; and a diffractive optical element provided in optical paths of the beams with the first and the second wavelengths. In the optical head, the diffractive optical element is a chromatic-aberration compensation element that compensates chromatic aberration caused by the objective lens and that has difference in level of a step-like shape or grooves substantially of a sawtooth shape, and with respect to the first wavelength $\lambda_1$, the second wavelength $\lambda_2$, and a refractive index n of a material of the chromatic-aberration compensation element, the difference in level or the groove depth is in a range substantially between $2\lambda_1/(n-1)$ and $\lambda_2/(n-1)$.

According to the above-mentioned second configuration, for example, a chromatic-aberration compensation element with excellent light utilization efficiency for the beams with the first and the second wavelengths can be obtained.

In the above-mentioned second configuration, it is preferable that the first wavelength $\lambda_1$ satisfies a relationship of $0.35\ \mu m \leq \lambda_1 \leq 0.44\ \mu m$ or the second wavelength $\lambda_2$ satisfies a relationship of $0.76\ \mu m \leq \lambda_2 \leq 0.88\ \mu m$.

In the above-mentioned second configuration, it is preferable that the chromatic-aberration compensation element is formed on the objective lens.

According to the above-mentioned preferable configuration, for example, the chromatic-aberration compensation element and the objective lens can be handled as one component, thus reducing the size and cost of the optical head.

In the above-mentioned second configuration, it is preferable that the chromatic-aberration compensation element and the objective lens are driven together by an actuator.

According to the above-mentioned preferable configuration, for example, an optical axis of the chromatic-aberration compensation element and that of the objective lens are not shifted from each other, thus obtaining excellent optical characteristics.

In the above-mentioned second configuration, it is preferable that the chromatic-aberration compensation element is a convex diffractive lens and forms converging light in cooperation with the objective lens.

According to the above-mentioned preferable configuration, for example, a numerical aperture of the objective lens itself can be reduced, thus facilitating the manufacture of the objective lens.

A third configuration of an optical head according to the present invention includes: at lest one light source for emitting a beam with a first wavelength, a beam with a second wavelength that is approximately twice as long as the first wavelength, and a beam with a third wavelength that is approximately 1.5 times as long as the first wavelength; a photodetector; and at least one diffractive optical element provided in optical paths of the beams with the first, the second, and the third wavelengths. In the optical head, outgoing light from the diffractive optical element is substantially a fourth-order diffraction light with respect to the beam with the first wavelength, is substantially a second-order diffraction light with respect to the beam with the second wavelength, and is substantially a third-order diffraction light with respect to the beam with the third wavelength.

According to the above-mentioned third configuration, for example, high diffraction efficiency can be obtained particularly for the beams with the first and the second wavelengths out of the beams with the three wavelengths even when the diffractive optical element is positioned in the optical path common to the beams with the first to the third wavelengths, thus obtaining an optical head with excellent optical characteristics.

In the above-mentioned third configuration, it is preferable that the diffractive optical element has a cross section substantially of a sawtooth shape, and with respect to the first wavelength $\lambda_1$, the second wavelength $\lambda_2$, the third wavelength $\lambda_3$, and a refractive index n of a material of the diffractive optical element, the groove depth in the sawtooth shape is substantially in a range between a minimum and a maximum among $4\lambda_1/(n-1)$, $2\lambda_2/(n-1)$, and $3\lambda_3/(n-1)$ in the case of a transmission element, is substantially in a range between a minimum and a maximum among $2\lambda_1/n$, $\lambda_2/n$, and $3\lambda_3/2n$ in the case of a reflection element onto which beams are incident from a substrate side, and is substantially in a range between a minimum and a maximum among $2\lambda_1$, $\lambda_2$, and $3\lambda_3/2$ in the case of a reflection element onto which beams are incident from an air side.

According to the above-mentioned preferable configuration, for example, a diffractive optical element with highest diffraction efficiency can be obtained particularly for the beams with the first and the second wavelengths out of the beams with the first to the third wavelengths.

In the above-mentioned third configuration, it is preferable that with respect to the first wavelength $\lambda_1$, a minimum period $\Lambda_{min}$ of the diffractive optical element satisfies a relationship of $\Lambda_{min} \geq 22\lambda_1$.

According to the above-mentioned preferable configuration, for example, a diffractive optical element with a high diffraction efficiency of at least 80% with respect to the beam with the first wavelength can be obtained.

In the above-mentioned third configuration, it is preferable that the first wavelength $\lambda_1$ satisfies a relationship of $0.35\ \mu m \leq \lambda_1 \leq 0.44\ \mu m$, the second wavelength $\lambda_2$ satisfies a relationship of $0.76\ \mu m \leq \lambda_2 \leq 0.88\ \mu m$, or the third wavelength $\lambda_3$ satisfies a relationship of $0.57\ \mu m \leq \lambda_3 \leq 0.68\ \mu m$.

According to the above-mentioned preferable configuration, for example, a small focusing spot can be obtained and thus high-density optical disks with, for instance, at least 10 Gbyte capacity, optical disks such as CDs and CD-Rs, or optical disks such as DVDs and DVD-Rs including a two-layer structure can be read.

In the above-mentioned third configuration, it is preferable that the first wavelength $\lambda_1$ satisfies substantially a relationship of $0.35\ \mu m \leq \lambda_1 \leq 0.44\ \mu m$, and the diffractive optical element is a chromatic-aberration compensation element for compensating chromatic aberration caused by an objective lens for focusing beams on an information recording medium.

A fourth configuration of an optical head according to the present invention includes: at least one light source for emitting a beam with a first wavelength, a beam with a second wavelength that is approximately twice as long as the first wavelength, and a beam with a third wavelength that is approximately 1.5 times as long as the first wavelength; a photodetector; an objective lens for focusing beams on an information recording medium; and at least one diffractive optical element provided in optical paths of the beams with the first, the second, and the third wavelengths. In the optical head, the diffractive optical element is a chromatic-aberration compensation element that compensates chromatic aberration caused by the objective lens and has difference in level of a step-like shape or grooves substantially of a sawtooth shape, and with respect to the first wavelength $\lambda1$, the second wavelength $\lambda_2$, the third wavelength $\lambda_3$, and a refractive index n of a material of the diffractive optical element, the difference in level or the groove depth is in a range between a minimum and a maximum among $4\lambda_1/(n-1)$, $2\lambda_2/(n-1)$, and $3\lambda_3(n-1)$.

According to the above-mentioned fourth configuration, for example, a chromatic-aberration compensation element with excellent light utilization efficiency particularly for the beams with the first and the second wavelengths out of the beams with the first to the third wavelengths can be obtained.

In the above-mentioned fourth configuration, it is preferable that the first wavelength $\lambda_1$ satisfies a relationship of $0.35\ \mu m \leq \lambda_1 \leq 0.44\ \mu m$, the second wavelength $\lambda_2$ satisfies a relationship of 0.76 $\mu$m$\leq\lambda_2\leq$0.88 $\mu$m, or the third wavelength $\lambda_3$ satisfies a relationship of 0.57 $\mu$m$\leq\lambda_3\leq$0.68 $\mu$m.

In the above-mentioned fourth configuration, it is preferable that the chromatic-aberration compensation element is formed on the objective lens.

In the above-mentioned fourth configuration, it is preferable that the chromatic-aberration compensation element and the objective lens are driven together by an actuator.

In the above-mentioned fourth configuration, it is preferable that the chromatic-aberration compensation element is a convex diffractive lens and forms converging light in cooperation with the objective lens.

A fifth configuration of an optical head according to the present invention includes: at least one light source for emitting a beam with a first wavelength and a beam with a second wavelength that is approximately 1.5 times as long as the first wavelength; a photodetector; and at least one diffractive optical element provided in optical paths of the beams with the first and the second wavelengths. In the optical head, outgoing light from the diffractive optical element is substantially a third-order diffraction light with respect to the beam with the first wavelength and is substantially a second-order diffraction light with respect to the beam with the second wavelength.

According to the above-mentioned fifth configuration, for example, high diffraction efficiency can be obtained for both the beams with the first and the second wavelengths even when the diffractive optical element is positioned in the optical path common to the beams with the first and the second wavelengths, thus obtaining an optical head with excellent optical characteristics.

In the above-mentioned fifth configuration, it is preferable that the diffractive optical element has a cross section substantially of a sawtooth shape, and with respect to the first wavelength $\lambda_1$, the second wavelength $\lambda_2$, and a refractive index n of a material of the diffractive optical element, the groove depth in the sawtooth shape is substantially in a range between $3\lambda_1/(n-1)$ and $2\lambda_2/(n-1)$ in the case of a transmission element, is substantially in a range between $3\lambda_1/2n$ and $\lambda_2/n$ in the case of a reflection element onto which beams are incident from a substrate side, and is substantially in a range between $3\lambda_1/2$ and $\lambda_2$ in the case of a reflection element onto which beams are incident from an air side.

According to the above-mentioned preferable configuration, for example, a diffractive optical element with highest diffraction efficiency for the beams with the first and the second wavelengths can be obtained.

In the above-mentioned fifth configuration, it is preferable that with respect to the first wavelength $\lambda_1$, a minimum period $\lambda_{min}$ of the diffractive optical element satisfies a relationship of $\Lambda_{min}\geq 16\lambda_1$.

According to the above-mentioned preferable configuration, for example, a diffractive optical element with a high diffraction efficiency of at least 80% with respect to the beam with the first wavelength can be obtained.

In the above-mentioned fifth configuration, it is preferable that the first wavelength $\lambda_1$ satisfies a relationship of 0.35 $\mu$m$\leq\lambda_1\leq$0.44 $\mu$m or the second wavelength $\lambda_2$ satisfies a relationship of 0.57 $\mu$m$\leq\lambda_2\leq$0.68 $\mu$m.

In the above-mentioned fifth configuration, it is preferable that the first wavelength $\lambda_1$ satisfies substantially a relationship of 0.35 $\mu$m$\leq\lambda_1\leq$0.44 $\mu$m, and the diffractive optical element is a chromatic-aberration compensation element for compensating chromatic aberration caused by an objective lens for focusing beams on an information recording medium.

A sixth configuration of an optical head according to the present invention includes: at least one light source for emitting a beam with a first wavelength and a beam with a second wavelength that is approximately 1.5 times as long as the first wavelength; a photodetector; an objective lens for focusing beams on an information recording medium; and a diffractive optical element provided in optical paths of the beams with the first and the second wavelengths. In the optical head, the diffractive optical element is a chromatic-aberration compensation element that compensates chromatic aberration caused by the objective lens and has difference in level of a step-like shape or grooves substantially of a sawtooth shape, and with respect to the first wavelength $\lambda_1$, the second wavelength $\lambda_2$, and a refractive index n of a material of the chromatic-aberration compensation element, the difference in level or the groove depth is substantially in a range between $3\lambda_1/(n-1)$ and $2\lambda_2/(n-1)$.

According to the above-mentioned sixth configuration, for example, a chromatic-aberration compensation element with excellent light utilization efficiency for the beams with the first and the second wavelengths can be obtained.

In the above-mentioned sixth configuration, it is preferable that the first wavelength $\lambda_1$ satisfies a relationship of 0.35 $\mu$m$\leq\lambda_1\leq$0.44 $\mu$m or the second wavelength $\lambda_2$ satisfies a relationship of 0.57 $\mu$m$\leq\lambda_2\leq$0.68 $\mu$m.

According to the above-mentioned preferable configuration, for example, a small focusing spot can be obtained and thus high-density optical disks with, for example, at least 10 GByte capacity or optical disks such as DVDs and DVD-Rs including a two-layer structure can be read.

In the above-mentioned sixth configuration, it is preferable that the chromatic-aberration compensation element is formed on the objective lens.

In the above-mentioned sixth configuration, it is preferable that the chromatic-aberration compensation element and the objective lens are driven together by an actuator.

In the above-mentioned sixth configuration, it is preferable that the chromatic-aberration compensation element is a convex diffractive lens and forms converging light in cooperation with the objective lens.

A seventh configuration of an optical head according to the present invention includes: at least one light source for emitting a beam with a first wavelength, a beam with a second wavelength that is approximately twice as long as the first wavelength, and a beam with a third wavelength that is approximately 1.5 times as long as the first wavelength; a photodetector; and at least one diffractive optical element provided in optical paths of the beams with the first, the second, and the third wavelengths. In the optical head, outgoing light from the diffractive optical element is substantially a sixth-order diffraction light with respect to the beam with the first wavelength, is substantially a third-order diffraction light with respect to the beam with the second wavelength, and is substantially a fourth-order diffraction light with respect to the beam with the third wavelength.

According to the above-mentioned seventh configuration, for example, high diffraction efficiency can be obtained for the beams with the three wavelengths even when the diffractive optical element is positioned in the optical path common to the beams with the three wavelengths, thus obtaining an optical head with excellent optical characteristics.

In the above-mentioned seventh configuration, it is preferable that the diffractive optical element has a cross section substantially of a sawtooth shape, and with respect to the first wavelength $\lambda_1$, the second wavelength $\lambda_2$, the third wavelength $\lambda_3$, and a refractive index n of a material of the diffractive optical element, the groove depth in the sawtooth shape is substantially in a range between a minimum and a maximum among $6\lambda_1/(n-1)$, $3\lambda_2/(n-1)$, and $4\lambda_3/(n-1)$ in the case of a transmission element, is substantially in a range between a minimum and a maximum among $3\lambda_1/n$, $3\lambda_2/2n$, and $2\lambda_3/n$ in the case of a reflection element onto which beams are incident from a substrate side, and is substantially in a range between a minimum and a maximum among $3\lambda_1$, $3\lambda_2/2$, and $2\lambda_3$ in the case of a reflection element onto which beams are incident from an air side.

According to the above-mentioned preferable configuration, for example, a diffractive optical element with highest diffraction efficiency for the beams with the first to the third wavelengths can be obtained.

An eighth configuration of an optical head according to the present invention includes: at least one light source for emitting a beam with a first wavelength, a beam with a second wavelength that is approximately twice as long as the first wavelength, and a beam with a third wavelength that is approximately 1.5 times as long as the first wavelength; a photodetector; an objective lens for focusing beams on an information recording medium; and at least one diffractive optical element provided in optical paths of the beams with the first, the second, and the third wavelengths. In the optical head, the diffractive optical element is a chromatic-aberration compensation element that compensates chromatic aberration caused by the objective lens and that has difference in level of a step-like shape or grooves substantially of a sawtooth shape, and with respect to the first wavelength $\lambda_1$, the second wavelength $\lambda_2$, the third wavelength $\lambda_3$, and a refractive index n of a material of the diffractive optical element, the difference in level or the groove depth is substantially in a range between a minimum and a maximum among $6\lambda_1/(n-1)$, $3\lambda_2/(n-1)$, and $4\lambda_3/(n-1)$.

According to the above-mentioned eighth configuration, for example, a chromatic-aberration compensation element with excellent optical characteristics for the beams with the first to the third wavelengths can be obtained.

In the above-mentioned eighth configuration, it is preferable that the chromatic-aberration compensation element is formed on the objective lens.

In the above-mentioned eighth configuration, it is preferable that the chromatic-aberration compensation element and the objective lens are driven together by an actuator.

In the above-mentioned eighth configuration, it is preferable that the chromatic-aberration compensation element is a convex diffractive lens and forms converging light in cooperation with the objective lens.

A ninth configuration of an optical head according to the present invention includes: a light source emitting a beam with a wavelength $\lambda$ that satisfies substantially a relationship of $0.35\ \mu m \leq \lambda \leq 0.44\ \mu m$; a photodetector; and at least one diffractive optical element provided in an optical path of the beam emitted from the light source. In the optical head, the diffractive optical element is a chromatic-aberration compensation element for compensating chromatic aberration caused by an objective lens for focusing beams on an information recording medium.

In the above-mentioned ninth configuration, it is preferable that the chromatic-aberration compensation element is formed on the objective lens.

In the above-mentioned ninth configuration, it is preferable that the chromatic-aberration compensation element and the objective lens are driven together by an actuator.

In the above-mentioned ninth configuration, it is preferable that the chromatic-aberration compensation element is a convex diffractive lens and forms converging light in cooperation with the objective lens.

DETAILED DESCRIPTION OF THE INVENTION

The present invention is described further in detail using embodiments as follows.

First Embodiment

Figure 1:
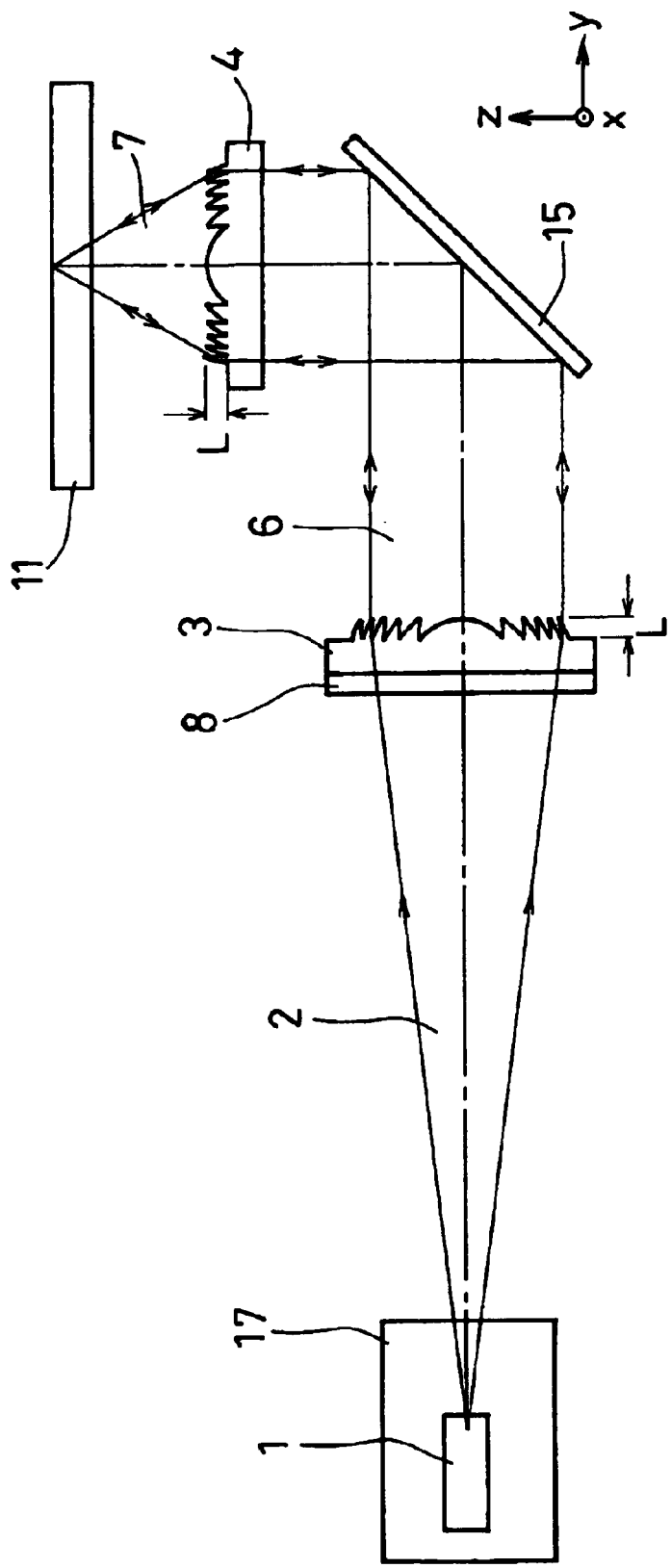
FIG. 1 is a side view showing the basic structure of an optical head and the manner of light transmission in the optical head according to a first embodiment of the present invention.

An optical head according to a first embodiment of the present invention is described in detail with reference to FIGS. 1 to 3, with the coordinate axes as indicated in FIG. 1.

FIG. 1 is a side view showing the basic configuration of an optical head and the manner of light transmission in the optical head according to the first embodiment of the present invention. FIG. 2 is a graph showing the relationship between a normalized wavelength and diffraction efficiency of a diffractive optical element when a period of the diffractive optical element is sufficiently larger than a wavelength of a laser beam to be used in the optical head according to the first embodiment. FIG. 3 is a graph showing the relationship between a normalized grating period and first-order and second-order diffraction efficiencies of the diffractive optical element in the optical head according to the first embodiment.

As shown in FIG. 1, in the optical head according to the present embodiment, a diffractive collimator lens 3, a diffractive objective lens 4, and a diffractive focusing/tracking error signal detection element 8 as diffractive optical elements are positioned in the optical path from a light source 1 to an optical disk 11 of a recording medium such as a DVD or a CD. The use of the diffractive optical elements in such a manner enables the thickness, weight, and cost of the optical head to be reduced.

The light source 1 can selectively emit a laser beam with a first wavelength and a laser beam with a second wavelength that is approximately twice as long as the first wavelength. The light source 1 and a photodetector (not shown in the figure) are integrated into a light-source/photodetector unit 17. In the present embodiment, an SHG light source is used as the light source 1 to obtain the above-mentioned the beams with the first and the second wavelengths. However, one in which two semiconductor lasers that emit a laser beam with the first wavelength and a laser beam with the second wavelength respectively are arranged may be used as the light source 1.

A laser beam 2 emitted from the semiconductor laser as the light source 1 in the y-axis direction passes through the detection element 8 (utilizing a zero-order diffraction light) and is collimated into an almost parallel beam 6 with, for example, a beam diameter of 3.25 mm by the collimator lens 3 integrated with the detection element 8. The optical path of the parallel beam 6 is bent in the z-axis direction by a mirror 15 and the laser beam 6 bent in the z-axis direction is then focused (converging light 7) on the optical disk 11 by the objective lens 4.

A laser beam 7 reflected by the optical disk 11 returns in the opposite direction and sequentially passes through the objective lens 4, is reflected by the mirror 15, and then passes through the collimator lens 3 with the optical path directing in the negative y-axis direction. The laser beam 7 is then divided by the detection element 8 (utilizing a first-order or second-order diffraction light) and thus the beams are detected by the photodetector.

In the optical head of the present embodiment, a wavelength $\lambda_1$ of the laser beam 2 with the first wavelength emitted from the light source 1 satisfies a relationship of, for example, $0.35\ \mu m \leq \lambda_1 \leq 0.44\ \mu m$, and by mounting the light source 1 emitting beams with this first wavelength, a small focusing spot can be obtained. As a result, high-density disks, for example, with at least 10 GByte capacity can be read. Further, a wavelength $\lambda_2$ of the laser beam 2 with the second wavelength emitted from the light source 1 satisfies a relationship of, for example, $0.76 \leq \lambda_2 \leq 0.88\ \mu m$, and by mounting the light source 1 emitting beams with this second wavelength, optical disks such as CDs or CD-Rs can be read. Thus, in the present embodiment, the wavelength of a beam to be emitted is determined depending on the type of the optical disk to be read, and the laser beam 2 with the determined wavelength is emitted selectively.

A diffractive optical element generally shows high diffraction efficiency for a design wavelength. However, the diffraction efficiency decreases gradually as a wavelength deviates from the design wavelength. Therefore, when the diffractive optical element is positioned in an optical path in which both the beams with the design wavelength and with wavelengths other than that pass, the diffraction efficiency decreases for either one of the beams.

Figure 2:
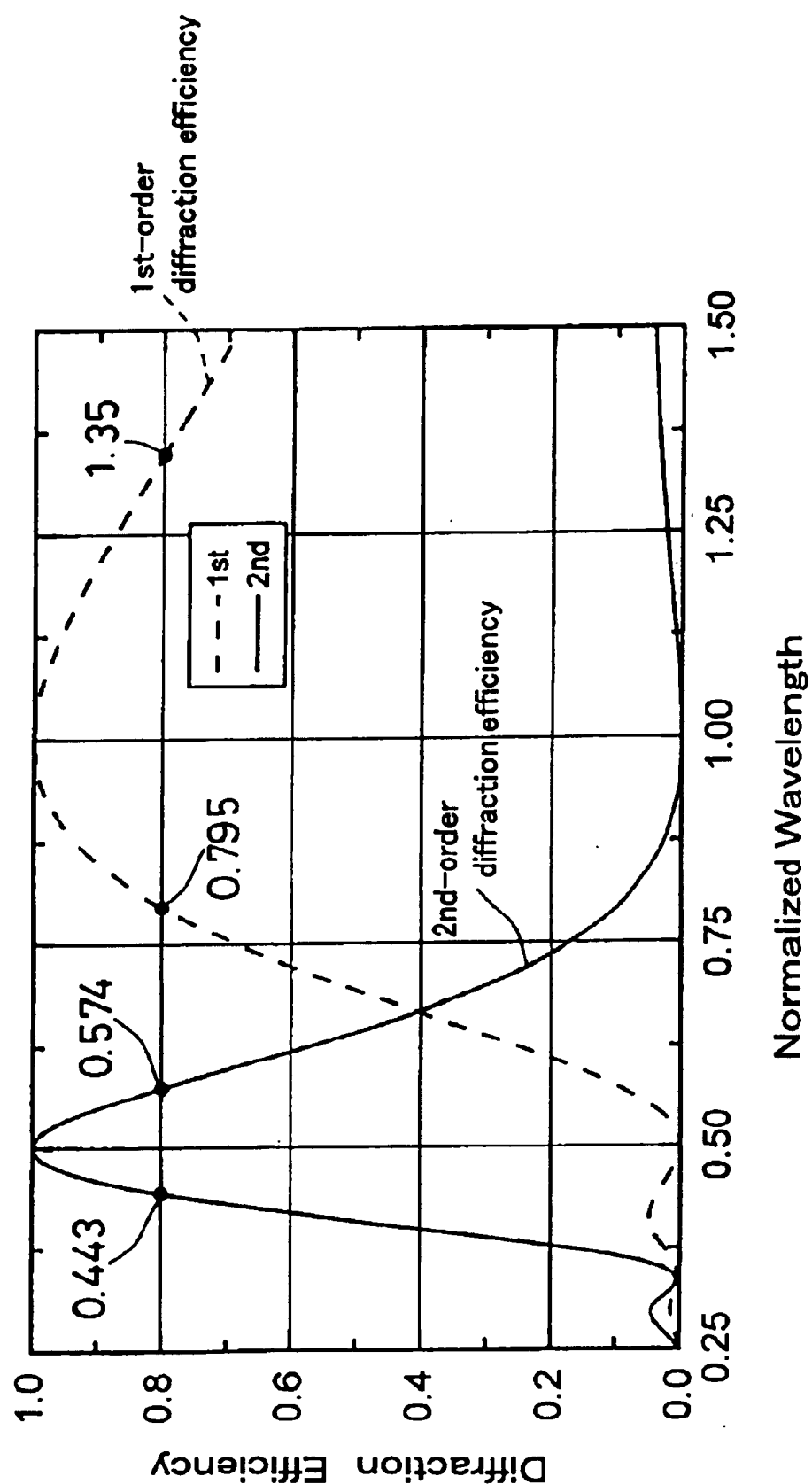
FIG. 2 is a graph showing the relationship between a normalized wavelength and diffraction efficiency of a diffractive optical element in the optical head according to the first embodiment of the present invention.

However, it was found that when the period of the diffractive optical element was sufficiently larger than a wavelength of light being incident onto the diffractive optical element and the wavelength was half the design wavelength (the normalized wavelength=1), the first-order diffraction efficiency decreased almost to 0 but the second-order diffraction efficiency increased almost to 100%, which was very high, as shown in FIG. 2. The inventors of the present invention found that in the optical head having a light source emitting both the beams with the first and the second wavelengths and reading both high-density optical disks and optical disks such as CDs or CD-Rs, wherein the two wavelengths were set so that one wavelength was substantially twice (practically, about 1.8 times to about 2.1 times) as long as the other, even when the diffractive optical element was positioned in an optical path common to both the beams with the first and the second wavelengths, high diffraction efficiency was obtained for both the beams with the first and the second wavelengths and therefore an optical head with excellent optical characteristics was achieved by using substantially a second-order diffraction light out of lights diffracted by the diffractive optical element when the optical head read high-density optical disks (when emitting the beam with the first wavelength) and substantially a first-order diffraction light out of the lights diffracted by the diffractive optical element when the optical head read optical disks such as CDs or CD-Rs (when emitting the beam with the second wavelength).

Usually, a diffraction angle in a diffractive optical element is determined depending on a wavelength of light being incident onto the diffractive optical element, a period of the diffractive optical element, and a diffraction order. However, the inventors of the present invention found that even when beams with different wavelengths were used, almost equal diffraction angles were obtained by using substantially a second-order diffraction light with respect to the beam with the first wavelength and substantially a first-order diffraction light with respect to the beam with the second wavelength that was approximately twice as long as the first wavelength. When this is applied to lenses, the focal lengths of the objective lens 4 and the collimator lens 3 in the present embodiment can almost be equalized with respect to the beams with the first and the second wavelengths. Therefore, the distance from the light source 1 to the collimator lens 3 can be set to be almost constant without depending on the wavelengths and the focal length of the objective lens 4 also can be set to be constant. Furthermore, since the diffraction angles are equal, the optical paths of the beams with the first and the second wavelengths from the detection element 8 to the photodetector also coincide completely. Consequently, the photodetector can be used for both the beams with the first and the second wavelengths commonly.

The diffractive optical elements such as the collimator lens 3 and the objective lens 4 in the present embodiment in which high diffraction efficiency can be obtained and substantially merely a single diffraction order is used have a cross section substantially of a sawtooth shape. In this case, with respect to the first wavelength $\lambda_1$, the second wavelength $\lambda_2$, and a refractive index n of a material of the diffractive optical elements, groove depth L in the sawtooth shape was set to be substantially in a range between $L_1=2\lambda_1 (n-1)$ and $L_2=\lambda_2(n-1)$ in the case of a transmission element such as the collimator lens 3 or the objective lens 4, substantially in a range between $L_1=\lambda_1/n$ and $L_2=\lambda_2/2n$ in the case of a reflection element onto which beams are incident from a substrate side, which is not shown in the present embodiment but will be described in another embodiment, and substantially in a range between $L_1=\lambda_1$ and $L_2=\lambda_2/2$ in the case of a reflection element onto which beams are incident from an air side, thus enabling high diffraction efficiency to be obtained for both the beams with the first and the second wavelengths.

For instance, if $\lambda_1=0.40$ $\mu$m, $\lambda_2=0.80$ $\mu$m, and n=1.5, then $L_1=L_2$, resulting in L=1.6 $\mu$m in the transmission element and L=0.27 $\mu$m (light incidence from a substrate side) and 0.4 $\mu$m (light incidence from an air side) in the reflection element. Further, if $\lambda_1=0.425$ $\mu$m, $\lambda_2=0.80$ $\mu$m, and n=1.5, then L=1.6 $\mu$m–1.7 $\mu$m in the transmission element and L=0.27 $\mu$m–0.28 $\mu$m (light incidence from a substrate side) and 0.4 $\mu$m–0.425 $\mu$m (light incidence from an air side) in the reflection element. As in the latter, when $2\lambda_1=\lambda_2$ does not hold perfectly, $L_1 \neq L_2$ holds and a preferable groove depth is in a range between $L_1$ and $L_2$. However, when the groove depth is $L_1$, the efficiency for the beam with the first wavelength $\lambda_1$ is given much weight, and when the groove depth is $L_2$, the efficiency for the beam with the second wavelength $\lambda_2$ is given much weight. Therefore, when the groove depth is exactly the average of them (0.5 ($L_1+L_2$)), the efficiencies for the beams with the first and the second wavelengths are brought into balance. The shorter the wavelength is, the more the light utilization efficiency is important. Consequently, it is more preferable to set the groove depth of the diffractive optical element to be $L_1$.

As shown in FIG. 2, for example, the wavelength ranges in which the diffraction efficiency of at least 80% can be obtained are 0.36 $\mu$m–0.47 $\mu$m and 0.65 $\mu$m–1.1 $\mu$m (the normalized wavelength of 1.0 corresponds to the second wavelength $\lambda_2$ in the present embodiment). Therefore, the diffractive optical elements in the present embodiment can ensure a diffraction efficiency of at least 80% for both the beams with the first and the second wavelengths when the period $\Lambda$ is sufficiently larger than the wavelength $\lambda$. In addition, a diffractive optical element with a multilevel-shaped cross section approximated to the sawtooth-shaped cross section in the present embodiment using a step-like shape also can be used. In this case, it is preferable that an optimum total groove depth is substantially in a range between $L_1=2(p-1)\lambda_1/[p(n-1)]$ and $L_2=(p-1)\lambda_2[p(n-1)]$ in the case of a transmission element, is substantially in a range between $L_1=(p-1)\lambda_1/pn$ and $L_2=(p-1)\lambda_2/2$ pn in the case of a reflection element onto which beams are incident from a substrate side, and is substantially in a range between $L_1=(p-1)\lambda_1/p$ and $L_2=(p-1)\lambda_2/2p$ in the case of a reflection element onto which beams are incident from an air side, wherein p indicates the number of levels.

A transmission diffractive optical element using a zero-order diffraction light in the going path and a first-order or second-order diffraction light in the return path, such as the focusing/tracking error signal detection element 8 in the present embodiment, has a cross section substantially of a sawtooth shape. In this case, with respect to the first wavelength $\lambda_1$, the second wavelength $\lambda_2$, and a refractive index n of a material of the diffractive optical element, groove depth L in the sawtooth shape is set to be in a range substantially between $L_1=\lambda_1(n-1)$ and $L_2=\lambda_2/[2(n-1)]$ in the case of the transmission element, in a range substantially between $L_1=\lambda_1/2n$ and $L_2=\lambda_2/4n$ in the case of a reflection element onto which beams are incident from a substrate side as described in another embodiment, and in a range substantially between $L_1=\lambda_1/2$ and $L_2=\lambda_2/4$ in the case of a reflection element onto which beams are incident from an air side, thus obtaining high light utilization efficiency in both the going and return paths. Further, a diffractive optical element with a multilevel-shaped cross section approximated to the sawtooth-shaped cross section in the present embodiment using a step-like shape also can be used. In this case, it is preferable that an optimum total groove depth is substantially in a range between $L_1=(p-1)\lambda_1/[p(n-1)]$ and $L_2=(p-1)\lambda_2/[2p(n-1)]$ in the case of a transmission element, is substantially in a range between $L_1=(p-1)\lambda_1/2pn$ and $L_2=(p-1)\lambda_2/4pn$ in the case of a reflection element onto which beams are incident from a substrate side, and is substantially in a range between $L_1=(p-1)\lambda_1/2p$ and $L_2=(p-1)\lambda_2/4p$ in the case of a reflection element onto which beams are incident from an air side, wherein p indicates the number of levels.

In FIG. 2, the period of the diffractive optical element was considered to be sufficiently greater than the wavelength of light being incident onto the diffractive optical element and the reflection loss on the surface of the diffractive optical element was neglected. Then, the relationship between diffraction efficiency and a normalized grating period $\Lambda/\lambda$ normalized by the wavelength $\lambda$ of light being incident onto the diffractive optical element was studied in detail including the reflection loss on the surface of the diffractive optical element. The result is shown in FIG. 3. In FIG. 3, the solid line indicates first-order diffraction efficiency and the broken line represents second-order diffraction efficiency. The diffractive optical element had a cross section substantially of a sawtooth shape, and the groove depth was set to an optimum value as described above. In this case, by the antireflection coating onto the surface of the diffractive optical element to eliminate reflection losses, the diffraction efficiency can be improved corresponding to the reflection losses.

Figure 3:
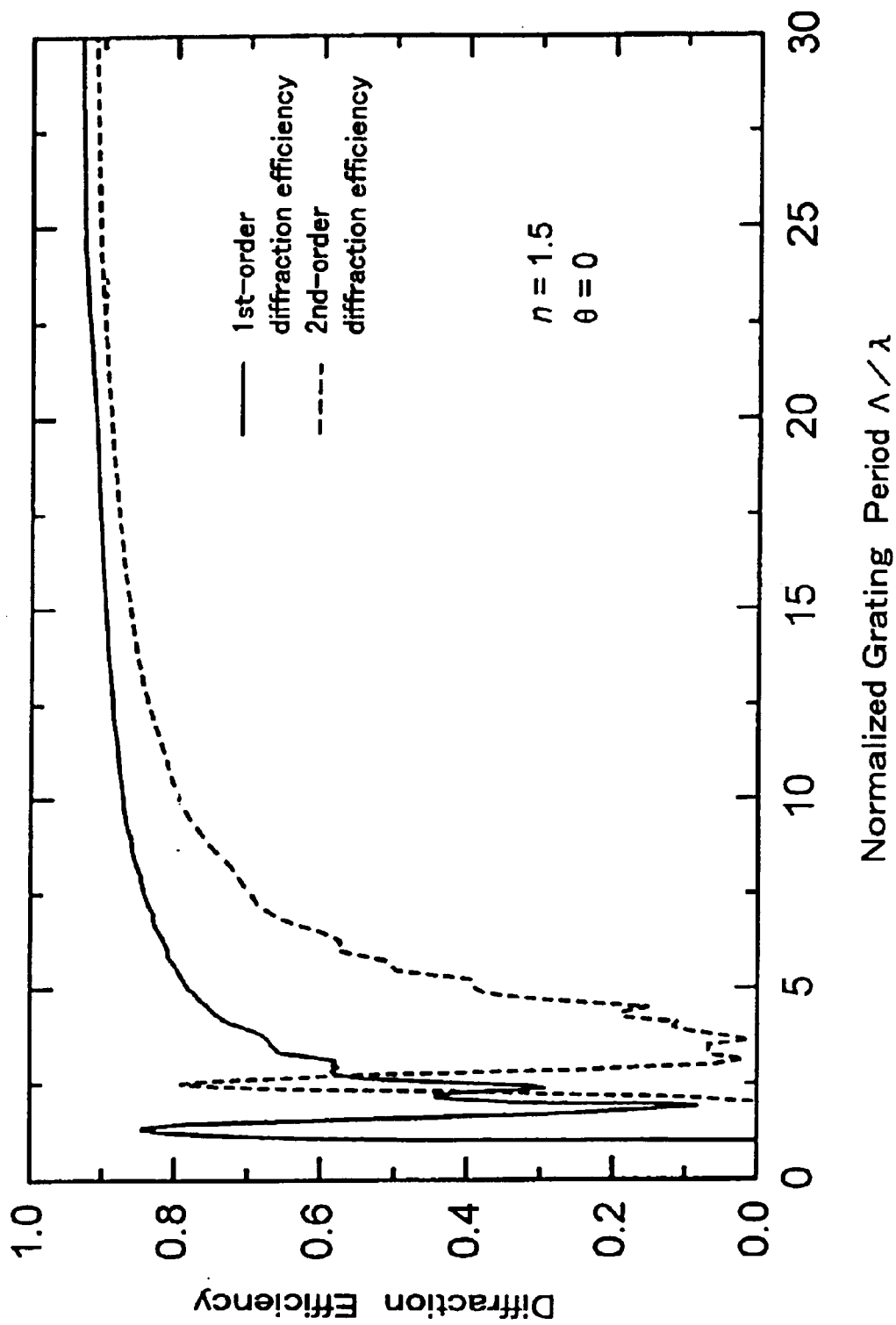
FIG. 3 is a graph showing the relationship between a normalized grating period and first-order and second-order diffraction efficiencies of the diffractive optical element in the optical head according to the first embodiment of the present invention.

As can be seen from FIG. 3, the first-order diffraction efficiency is better than the second-order diffraction efficiency, but both the diffraction efficiencies tend to decrease as the period $\Lambda/\lambda$ becomes smaller. A diffraction efficiency of at least 80% can be obtained for both the beams with the first and the second wavelengths when the period $\Lambda/\lambda$ is at least 10. Therefore, when with respect to the first wavelength $\lambda_1$, the minimum period $\Lambda_{min}$ of the diffractive optical element is set to satisfy a relationship of $\Lambda_{min} \geq 10\lambda_1$, a diffraction efficiency of at least 80% can be obtained for both the beams with the first and the second wavelengths. Furthermore, a diffraction efficiency of at least 90% also can be obtained for both the beams with the first and the second wavelengths when with respect to the first wavelength $\lambda_1$, the minimum period $\Lambda_{min}$ of the diffractive optical element is set to satisfy a relationship of $\Lambda_{min} \geq 22 \lambda_1$.

The diffractive lenses 3 and 4 are formed of, for example, concentric-circle gratings and have structures in which the period is shortened gradually toward the outer circumferences of the gratings. In the present embodiment, the collimator lens 3 has a numerical aperture of, for example, 0.15 and the minimum period at the outermost circumference is $13\lambda_1$. Consequently, a diffraction efficiency of at least 80% can be obtained for both the beams with the first and the second wavelengths throughout the whole lens area. However, with respect to the beams with the first and the second wavelengths, the diffractive objective lens has numerical apertures of, for example, 0.6 and 0.45, and the minimum periods at the outermost circumference are $3.3\lambda_1$ and $2.2\lambda_2$, respectively. Therefore, the diffraction efficiency decreases at its circumference.

In the present embodiment, outgoing light from the diffractive optical element is substantially a second-order diffraction light with respect to the beam with the first wavelength and is substantially a first-order diffraction light with respect to the beam with the second wavelength so that high diffraction efficiency can be obtained for both the beams with the first and the second wavelengths. However, the outgoing light may be substantially a fourth-order diffraction light with respect to the beam with the first wavelength and substantially a second-order diffraction light with respect to the beam with the second wavelength (in this case, the groove depth is set to be in a range between, for example, $4\lambda_1/(n-1)$ and $2\lambda_2/(n-1)$). However, the higher the diffraction order of light is, the more the groove depth increases with respect to a wavelength. Therefore, the diffraction efficiency tends to decrease as also can be seen from FIG. 13 described later.

In addition, the present embodiment employs three diffractive optical elements, but it is not always necessary to use all of them. Even when only one of them is used, it provides an effect. Further, the directions in which the diffractive optical elements are arranged may be opposite to those in the present embodiment. Particularly, when the surface with grooves of the objective lens 4 is directed to the side opposite to the optical disk 11, influences of dirt and dust on the optical disk 11 can be avoided and furthermore, the surface of the objective lens 4 can be wiped. Moreover, the collimator lens 3 and the focusing/tracking error signal detection element 8 may be positioned oppositely.

Second Embodiment

An optical head according to the second embodiment of the present invention is described with reference to FIG. 4, with emphasis on differences with respect to one according to the aforementioned first embodiment.

Figure 4:
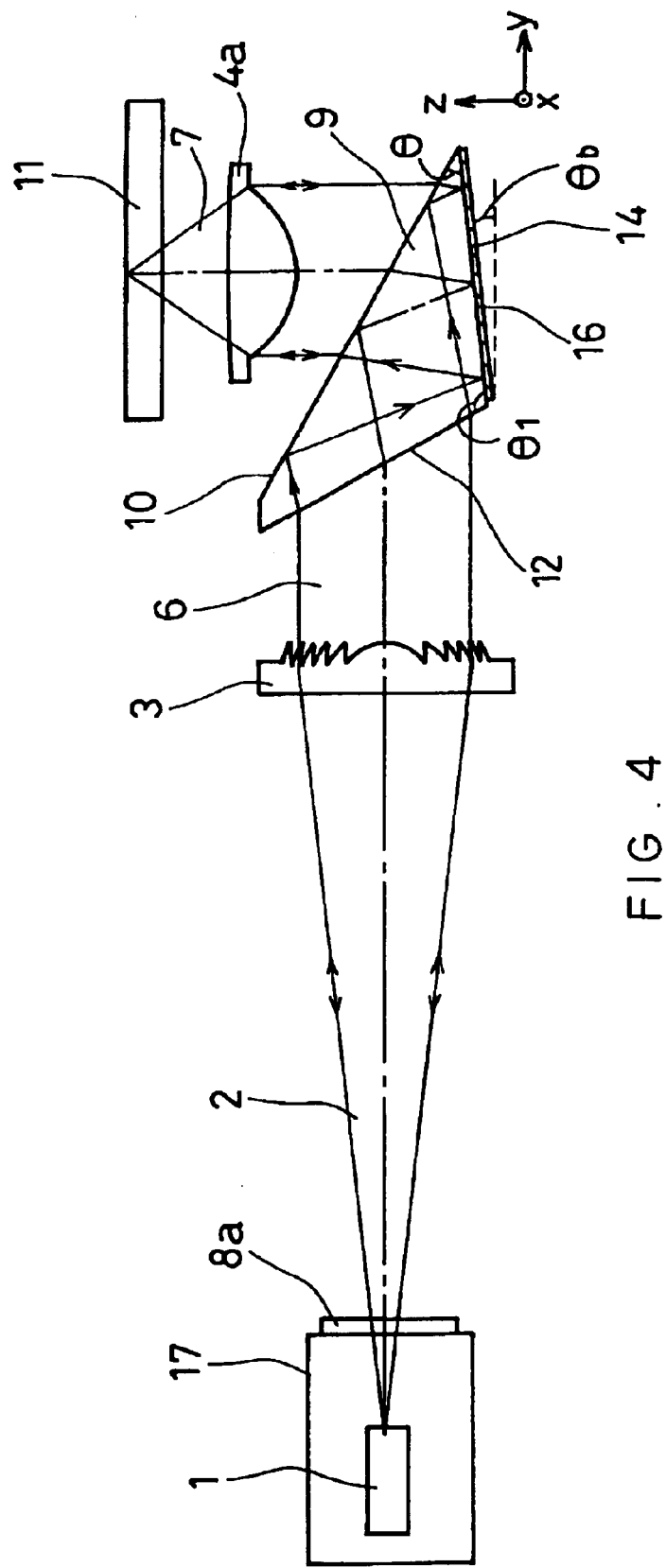
FIG. 4 is a side view showing the basic structure of an optical head and the manner of light transmission in the optical head according to a second embodiment of the present invention.

FIG. 4 is a side view showing the basic configuration of an optical head and the manner of light transmission in the optical head according to the second embodiment of the present invention.

The optical head of the present embodiment has an extra-thin structure and can read high-density disks with, for example, at least 10 GByte capacity and optical disks such as CDs or CD-Rs.

As shown in FIG. 4, a diffractive focusing/tracking error signal detection element 8a is positioned in a window side of a light-source/photodetector unit 17. Instead of a mirror for bending an optical path, a refractive optical means 9 formed of a prism with three optical surfaces is used. As an objective lens 4a, an aspherical lens is used.

In the refractive optical means 9, suppose the surface on the side of an information recording medium is a first surface (a slant face) 10, the surface on the light source side is a second surface (a side face) 12, and the surface other than those is a third surface (a bottom face) 14. In this case, a laser beam 2 emitted from a light source 1 is collimated into an almost parallel beam 6 by a diffractive collimator lens 3. The light source 1 selectively emits a beam with a first wavelength $\lambda_1$ satisfying a relationship of, for example, 0.35 $\mu m \leq \lambda_1 \leq 0.44$ $\mu$m and a beam with a second wavelength $\lambda_2$ satisfying a relationship of, for example, $0.76_{\mu m \leq \lambda_2} \leq 0.88$ $\mu$m that is approximately twice as long as the wavelength $\lambda_1$. The almost parallel beam 6 passes through the second surface 12 of the means 9, is totally reflected by the first surface 10, and then is reflected by the third surface 14 with a reflection coating formed of, for example, Al or a multilayer film. The almost parallel beam 6 reflected by the third surface 14 of the means 9 passes through the first surface 10. Thus, the optical axis of the beam that has passed through the first surface 10 is bent substantially at 90° with respective to that of the almost parallel beam 6 between the collimator lens 3 and the means 9. Thus, when the configuration in which beams propagate within the means 9 in a zigzag manner is employed, the bottom of the objective lens 4a can be positioned lower than the highest position (the height from the bottom of the optical head or an optical base (not shown) in the z-axis direction) of beams entering the second surface 12 of the means 9 that have been collimated into the almost parallel beam 6 by the collimator lens 3. Therefore, the optical head can be reduced in height (in size in the z-axis direction) greatly, thus obtaining an extra-thin optical head.

The specification of the means 9 is described as follows. The bottom face of the means 9 has a mounting angle $\theta_b$ of, for example, 5.0°, one base angle $\theta$ of the means 9 is, for example, 29.3°, the other base angle $\theta_1$ of the means 9 is, for example, 114.3°, and the length of the third surface (the bottom face) 14 is 4.4 mm. As a glass material for the means (a prism) 9, BK7 is used. In this case, a beam diameter of an incident beam onto the means 9 is set to be equal to that of an outgoing beam from the means 9 (a configuration not requiring beam shaping). In addition, given a refractive index n of the glass material of the means 9 and a mounting angle $\theta_b$ of the bottom face of the means 9, one base angle $\theta$ of the means 9 satisfies substantially relationships of sin $(\theta-\theta_b)=n \cdot \sin (4\theta-2\theta-90°-\theta')$ and $n \cdot \sin\theta'=\sin (\theta-\theta_b)$, and the other base angle $\theta_1$ of the means 9 satisfies substantially a relationship of $\theta_1=\theta+90°-2\theta_b$. In the present embodiment, the mounting angle of the means 9 was set to be, for example, $\theta_b=5°$. However, it was found that a mounting angle substantially in the range of 2° to 10° was preferable, since sufficient margin was obtained in the space between the left edge of the objective lens 4a and the means 9.

Similarly in the present embodiment, outgoing light from the diffractive optical elements 3 and 8a is substantially a second-order diffraction light with respect to the beam with the first wavelength and is substantially a first-order diffraction light with respect to the beam with the second wavelength as in the above-mentioned first embodiment, thus obtaining high diffraction efficiency for both beams with the first and the second wavelengths.

Further, the detection element 8a may be integrated with the collimator lens 3 into one component as in the above-mentioned first embodiment. In addition, the objective lens 4 may be a diffractive lens.

Third Embodiment

An optical head of a third embodiment according to the present invention is described with reference to FIG. 5, with emphasis on differences with respect to one according to the aforementioned second embodiment.

Figure 5:
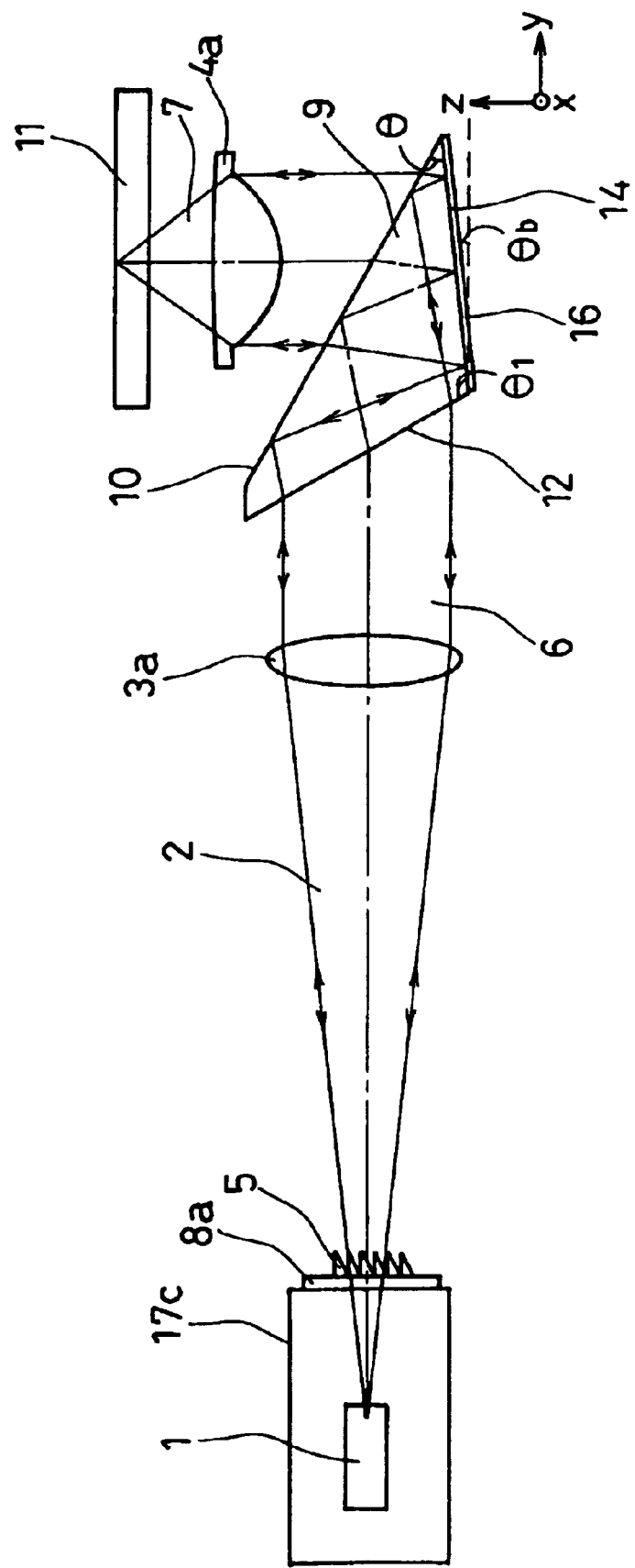
FIG. 5 is a side view showing the basic structure of an optical head and the manner of light transmission in the optical head according to a third embodiment of the present invention.

FIG. 5 is a side view showing the basic configuration of an optical head and the manner of light transmission in the optical head according to the third embodiment of the present invention.

As shown in FIG. 5, a diffractive optical element 5 that is a grating with a uniform period of, for example, 10 μm in the x-axis direction is positioned while being integrated with a focusing/tracking error signal detection element 8a into one component in the present embodiment. As a collimator lens 3a, an aspherical lens is used.

A light source 1 has two semiconductor lasers that are arranged adjacently. One of the semiconductor lasers emits a laser beam 2 with a first wavelength $\lambda_1$ satisfying a relationship of, for example, 0.35 μm ≤ $\lambda_1$ ≤ 0.44 μm and the other semiconductor laser emits a laser beam 2 with a second wavelength $\lambda_2$ satisfying a relationship of, for example, 0.76 μm ≤ $\lambda_2$ ≤ 0.88 μm that is approximately twice as long as the wavelength $\lambda_1$. The light source 1 can emit the laser beams with the first wavelength $\lambda_1$ and with the second wavelength $\lambda_2$ selectively. Outgoing light from the diffractive optical element 5 is substantially a second-order diffraction light having a diffraction angle of, for example, 4.7° with respect to the laser beam 2 with the first wavelength and is substantially a first-order diffraction light having the same diffraction angle of, for example, 4.7° with respect to the laser beam 2 with the second wavelength. Therefore, with respect to the laser beams with the first and the second wavelengths, almost the same diffraction angles can be obtained in the diffractive optical element 5, thus enabling optical axes of outgoing laser beams 2 from the diffractive optical element 5 almost to coincide with each other.

In the present embodiment, the semiconductor lasers are used as the light source 1. Therefore, a high frequency module or self-oscillation typically causes lengthening of wavelength of about 1 nm, and a central wavelength of outgoing light varies due to the change in environmental temperature.

In the present embodiment, the laser beam 2 is incident onto a side face 12 and a slant face 10 of a refractive optical means 9 with its optical axis being oblique, thus causing different refraction angles due to chromatic dispersion when a wavelength range is wide. When the diffractive optical element 5 is positioned in an optical path so that the variation in diffraction angle of diffraction light and that in refraction angle in the means 9 are compensated with each other, the chromatic dispersion is eliminated and thus beams can be focused on an optical disk 11 excellently. Particularly in the wavelength range of 0.35 μm–0.44 μm (the first wavelength), a glass (the means 9 formed of a prism) causes great chromatic dispersion, and therefore the cancellation of the chromatic dispersion by the diffractive optical element 5 is highly effective in forming an excellent focusing spot on the optical disk 11.

The inventors of the present invention found that when the glass material forming the means 9 of a prism has low dispersion, chromatic aberration was cancelled out by the element 6 to such an extent as almost not to be a problem in a wide wavelength range and at the same time the period of the diffractive optical element 5 compensating chromatic aberration was able to be enlarged, thus enabling easy manufacture of the element and obtaining high diffraction efficiency. In addition, the inventors also found that practically the wavelength variation occurs mostly in the range of ±10 nm in the first wavelength and in this case, when the glass material has an Abbe number of at least 64, an optical spot was formed on the optical disk 11 while being affected a little by the chromatic aberration. Consequently, as the glass material, desirable materials include BK7, FC5, FK5, FCD1, FCD10, FCD100, and the like.

In the optical head of the present embodiment, the diffractive optical element 5 that is a grating with a uniform period is positioned in the optical path of converging light or diverging light from the light source 1 to the collimator lens 3a. The inventors of the present invention found that when the diffractive optical element 5 that was a grating for compensating chromatic aberration was positioned in such an optical path of converging light or diverging light, the compensation effect varied depending on incident angles (the compensation effect for chromatic aberration increases as light is incident more obliquely). Therefore, precisely speaking, period distribution in the diffractive optical element 5 in the z-axis direction is required to be varied according to the convergent angles of the outgoing beams 2. However, it was found that when the diffractive optical element 5 that was a grating for compensating chromatic aberration was positioned in an optical path of converging light or diverging light with a numerical aperture of 0.39 or less, a problem caused by the chromatic aberration was not found in the spot focused on the optical disk 11 by the objective lens 4a. Consequently, the diffractive optical element 5 that is a grating with a uniform period can be used, thus facilitating position adjustment and manufacture of the optical head.

Fourth Embodiment

An optical head according to a fourth embodiment of the present invention is described with reference to FIG. 6, with emphasis on differences with respect to one according to the above-mentioned third embodiment.

FIG. 6(a) is a side view showing the basic configuration of the optical head and the manner of light transmission in the optical head according to the fourth embodiment of the present invention. FIG. 6(b) is a plane view showing the basic configuration of the optical head and the manner of light transmission in the optical head according to the fourth embodiment of the present invention.

Figure 6:
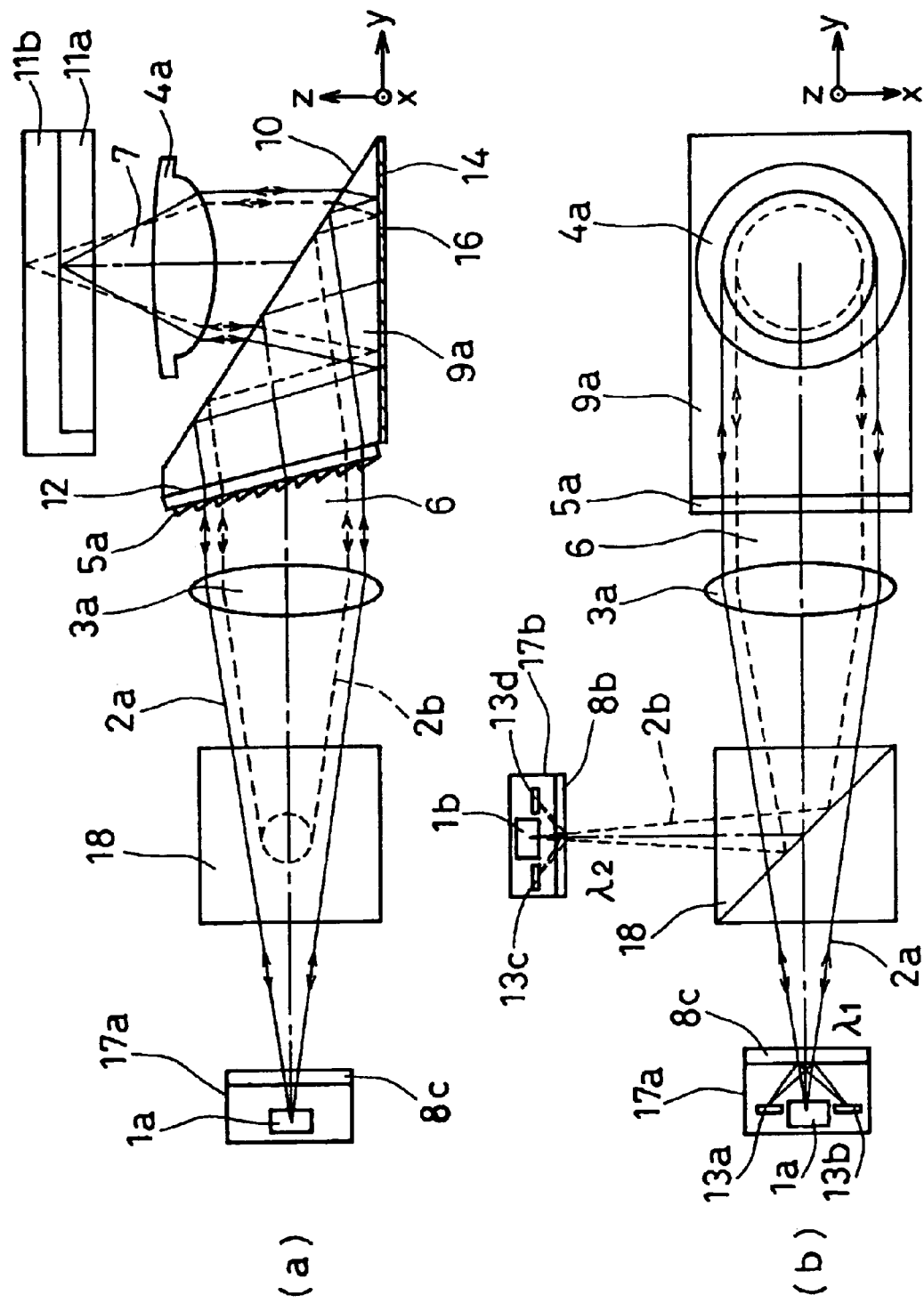
FIG. 6(a) is a side view showing the basic structure of an optical head and the manner of light transmission in the optical head according to a fourth embodiment of the present invention.
FIG. 6(b) is a plane view showing the basic structure of the optical head and the manner of light transmission in the optical head according to the fourth embodiment of the present invention.

As shown in FIG. 6, in the present embodiment, a light source 1a emitting a beam with a first wavelength $\lambda_1$ and a light source 1b emitting a beam with a second wavelength $\lambda_2$ that is approximately twice as long as the first wavelength $\lambda_1$ are positioned inside separate light-source/photodetector units 17a and 17b together with photodetectors 13 provided for the beams with the first and the second wavelengths, respectively. A beam splitter 18 couples and divides the beams with the first and the second wavelengths. The beam splitter 18 is not limited to this as long as it is an element capable of coupling and dividing the beams with the first and the second wavelengths, and it may be a wedge prism or the like.

On a side face of a refractive optical means 9a formed of a prism, a diffractive optical element 6a that is a grating for compensating chromatic aberration caused by the means 9a is provided while being integrated with the means 9a into one component. As in the above-mentioned third embodiment, outgoing light from the element 5a is substantially a second-order diffraction light with respect to the beam with the first wavelength and is substantially a first-order diffraction light with respect to the beam with the second wavelength. Thus, high diffraction efficiency for both the beams with the first and the second wavelengths can be obtained. Further, by positioning the element 5a that is a grating for compensating chromatic aberration in an optical path of an almost parallel beam 6, almost the same diffraction efficiencies and chromatic-aberration compensation effects can be obtained throughout the whole surface of the element 5a. In addition, since the element 6a and the means 9a are integrated into one component, a stable structure can be obtained and they can be handled as one component, thus facilitating position adjustment.

Furthermore, in the present embodiment, a bottom face 14 of the means 9a formed of a prism has a mounting angle of 0° and therefore can be positioned without any adjustments on an optical base (not shown) on which the means 9a is placed, thus facilitating the position adjustment. In this case, the element 6a that is a grating may be positioned on the other surface 10 or 14 of the means 9a formed of a prism.

Fifth Embodiment

An optical head according to a fifth embodiment of the present invention is described with reference to FIG. 7, with emphasis on differences with respect to one according to the above-mentioned first embodiment.

Figure 7:
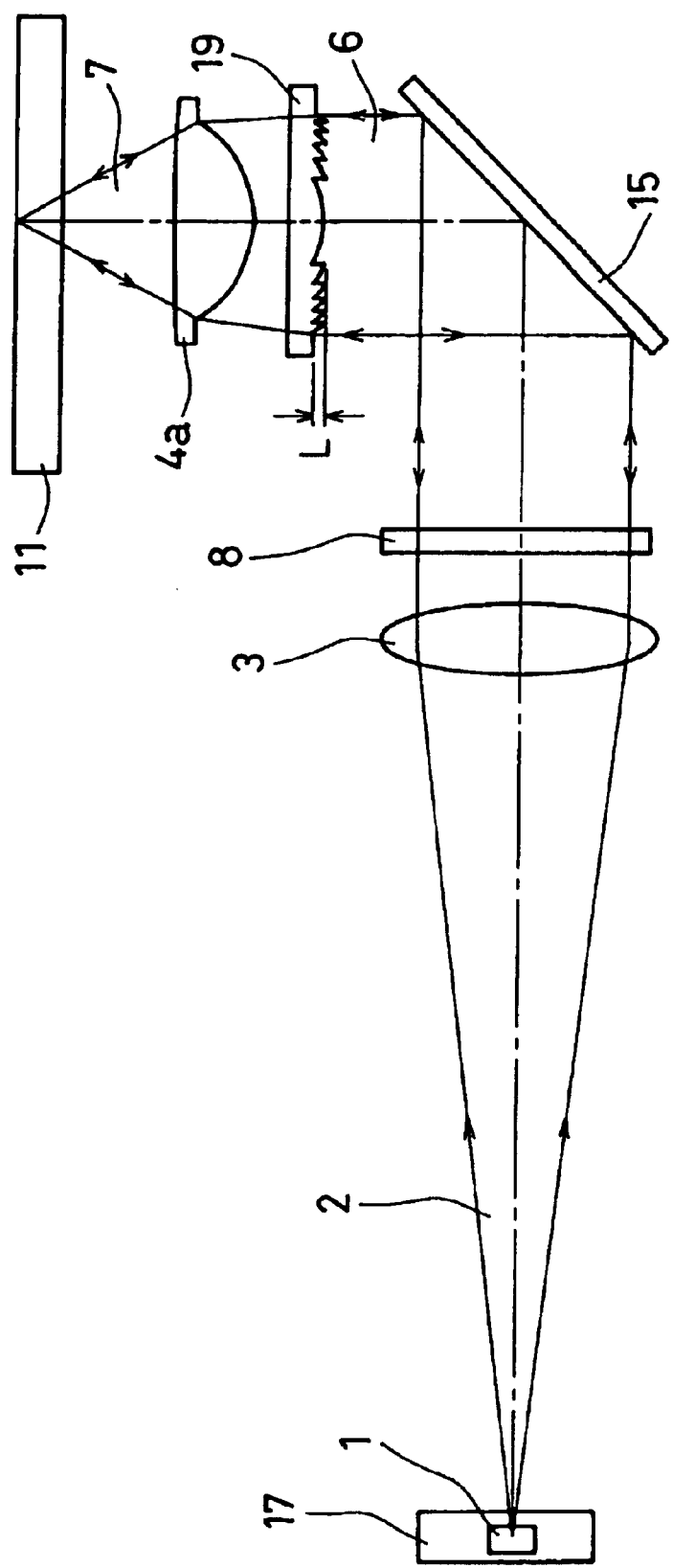
FIG. 7 is a side view showing the basic structure of an optical head and the manner of light transmission in the optical head according to a fifth embodiment of the present invention.

FIG. 7 is a side view showing the basic configuration of the optical head and the manner of light transmission in the optical head according to the fifth embodiment of the present invention.

As shown in FIG. 7, in the optical head of the present embodiment, a chromatic-aberration compensation element 19 for compensating chromatic aberration caused by an objective lens 4a is positioned in the optical path between a mirror 15 for bending an optical path and the objective lens 4a. In this case, the objective lens 4a and the collimator lens 3 are aspherical lenses.

The inventors found that since a glass exhibits great chromatic dispersion in a wavelength range of 0.35 μm–0.44 μm (a first wavelength), and in the case of the optical head designed to have specifications including a glass material of the objective lens 4a of, for example, VC79 (with an Abbe number of 57.7), a wavelength of, for example, $\lambda_1=0.4$ μm, and a numerical aperture, NA=0.6, even when the wavelength of incident light was varied merely for ±1 nm, the position of a focusing spot was varied (for example, 0.8 μm) to exceed the focal depth (±0.56 μm), thus causing a problem of failing to obtain an excellent spot (out of focus). This problem occurs, for instance, when a high frequency module or self-oscillation causes the broadening of a wavelength range (a wavelength lengthening of about ±1 nm).

In the present embodiment, by positioning the element 19 for compensating the chromatic aberration caused by the objective lens 4a, an optical head in which such a problem can be solved is obtained.

Further, when information is written in and readout from a optical RAM disk at high speed, the focal position of a beam with a first wavelength easily varies outstandingly and therefore the present invention provides a great effect in this case.

The element 19 is a convex diffractive lens and has a patterned form in which the period is shortened gradually toward the outer circumference of a concentric-circle grating. As described thus far, the element 19 has a cross section substantially of a sawtooth shape and groove depth L that causes substantially a second-order diffraction light with respect to a beam to with the first wavelength and substantially a first-order diffraction light with respect to a beam with a second wavelength that is approximately twice as long as the first wavelength.

In this case, with respect to the first wavelength $\lambda_1$, the second wavelength $\lambda_2$, and a refractive index n of a material of the chromatic-aberration compensation element 19, the groove depth L is substantially in a range between $L_1=2\lambda_2/(n-1)$ and $L_2=\lambda_2/(n-1)$ as in the first embodiment, and thus high diffraction efficiency can be obtained for both beams with the first and the second wavelengths.

In the present embodiment, the element 19 is a convex diffractive lens with, for example, an F number of 10.0 (a numerical aperture, NA=0.05). As shown in FIG. 7, by the element 19 an almost parallel beam 6 slightly converges to become converging light. Finally the converging light is further converged by the objective lens 4a into converging light 7, for example, with a numerical aperture, NA=0.66. Therefore, the numerical aperture of the objective lens 4a itself can be reduced substantially to, for example, about 0.6, thus compensating the chromatic aberration and facilitating the manufacture of the objective lens 4a.

In the present embodiment, the element 19 and the objective lens 4a are driven together by an actuator. This configuration enables the optical axes of both the components to coincide with each other continually, thus obtaining excellent optical characteristics.

Sixth Embodiment

An optical head according to a sixth embodiment of the present invention is described with reference to FIGS. 8 and 9, with emphasis on differences with respect to one according to the above-mentioned fifth embodiment.

Figure 8:
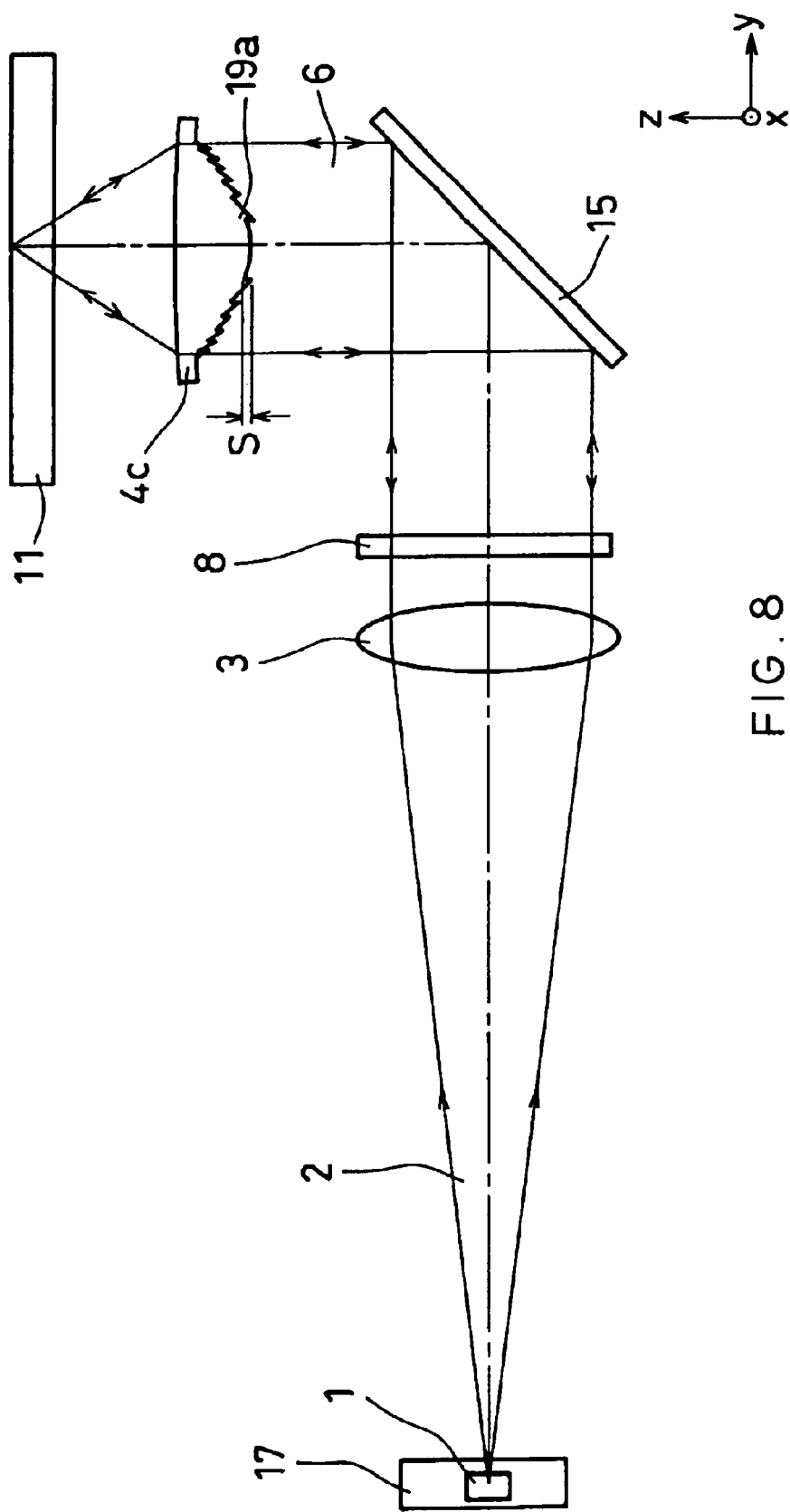
FIG. 8 is a side view showing the basic structure of an optical head and the manner of light transmission in the optical head according to a sixth embodiment of the present invention.

FIG. 8 is a side view showing the basic configuration of the optical head and the manner of light transmission in the optical head according to the sixth embodiment of the present invention. FIG. 9(a) is a cross-sectional view showing an objective lens on which a chromatic-aberration compensation element is formed, in the optical head according to the sixth embodiment of the present invention and FIG. 9(b) is a plane view thereof.

Figure 9:
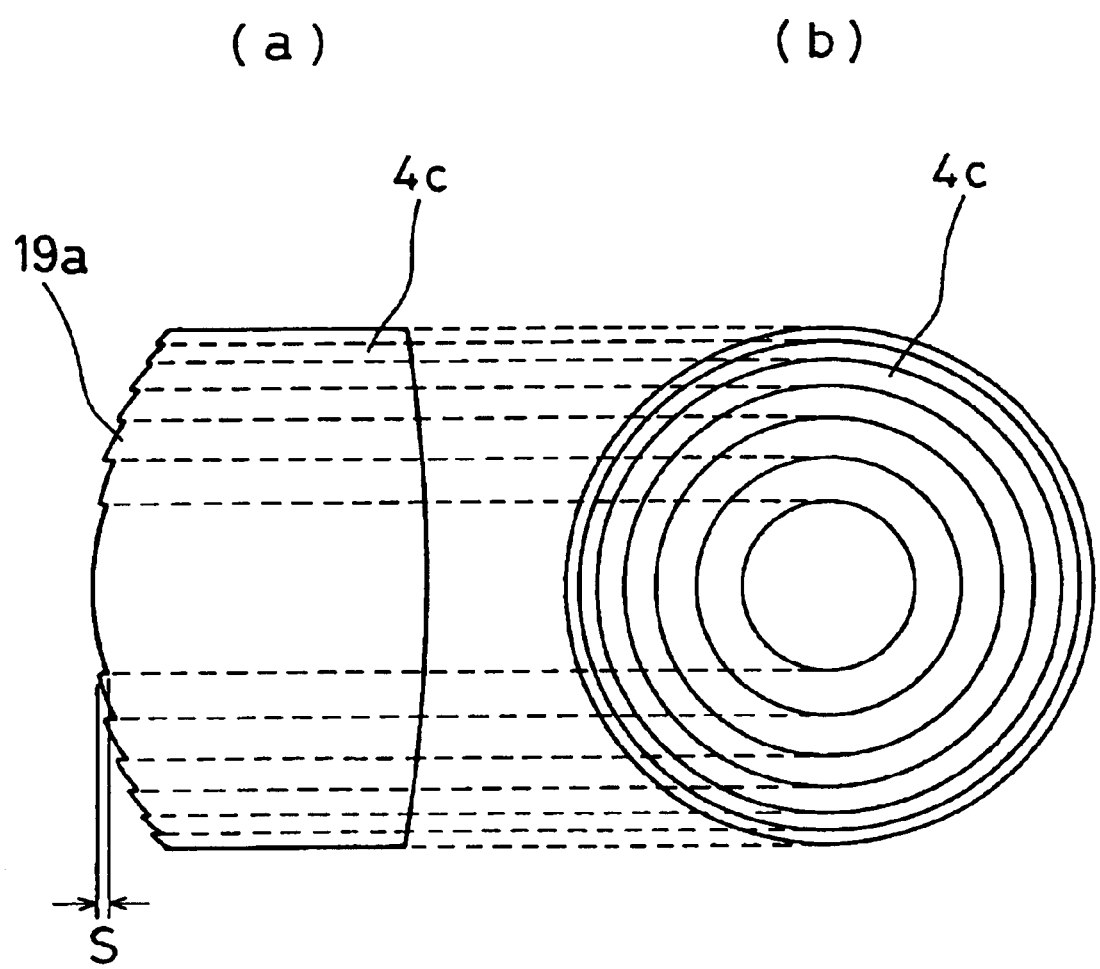
FIG. 9(a) is a cross-sectional view showing an objective lens on which a chromatic-aberration compensation element in the optical head is formed according to the sixth embodiment of the present invention and FIG. 9(b) is a plane view showing the objective lens on which the chromatic-aberration compensation element in the optical head is formed according to the sixth embodiment of the present invention.

In the present embodiment, as shown in FIGS. 8 and 9, a chromatic-aberration compensation element 19a having a concentric-circles patterned form and a cross section substantially of a sawtooth shape (groove depth s) is formed on an objective lens 4c. Thus, by integrating the element 19a and the objective lens 4c into one component, the optical head can be reduced in size and position adjustment can be facilitated.

With respect to a first wavelength $\lambda_1$, a second wavelength $\lambda_2$ that is approximately twice as long as the first wavelength, and a refractive index n of a material of the chromatic-aberration compensation element 19a, the groove depth s is set to be in a range between $s_1=2\lambda_1/(n-1)$ and $s_2=\lambda_2/(n-1)$, and in the case of incident beams with the first and the second wavelengths $\lambda_2$ or $\lambda_2$ that are equivalent to the design wavelengths, phase differences between incident light and outgoing light are substantially $4n$ and $2n$ respectively (with respect to both beams with the first and the second wavelengths, their phases are substantially equivalent). Consequently, as in the case where no element 19a is provided, almost no optical loss is caused with respect to both the beams with the first and the second wavelengths and therefore the beams can be focused by the objective lens 4c excellently. However, when the wavelength of the incident light is deviated from the design wavelength, the phase differences due to the groove depth of the element 19a are varied from $4\pi$ and $2\pi$, respectively. Therefore, the element 19a performs wavefront conversion so as to cancel out the variation in focal point of the objective lens 4a due to the deviation in wavelength. In other words, when the wavelength of an almost parallel beam (incident light) 6 is longer, the refractive index of a glass material of the objective lens 4c decreases. As a result, the focal length of the objective lens 4c is lengthened. However, the phase differences due to the groove depth of the element 19a become smaller than $4\pi$ and $2\pi$ for the beams with the first and the second wavelengths respectively, and therefore outgoing light from the element 19a becomes converging light. Thus, the element 19a functions substantially to shorten the focal length of the objective lens 4c, resulting in no variation in focal length as a total.

In the present embodiment, the phase differences due to the groove depth of the element 19a are substantially $4\pi$ and $2\pi$ with respect to the beams with the first and the second wavelengths respectively, and the groove depth s is set to be in the rage between $s_1=2\lambda_1/(n-1)$ and $s_2=\lambda_2/(n-1)$ so that with respect to both the beams with the first and the second wavelengths, the phase differences due to the groove depth of the element 19a are not varied from $4\pi$ and $2\pi$, respectively. However, the groove depth s may be set to be in the rage between $s_1=4\lambda_1(n-1)$ and $s_2=2\lambda_2/(n-1)$ so that the phase differences due to the groove depth of the element 19a are substantially $8\pi$ and $4\pi$ with respect to the beams with the first and the second wavelengths, respectively. In this case, however, the groove depth increases, and therefore the optical loss increases compared to the former.

Seventh Embodiment

An optical head according to a seventh embodiment of the present invention is described with reference to FIG. 10, with emphasis on differences with respect to one according to the above-mentioned first embodiment.

Figure 10:
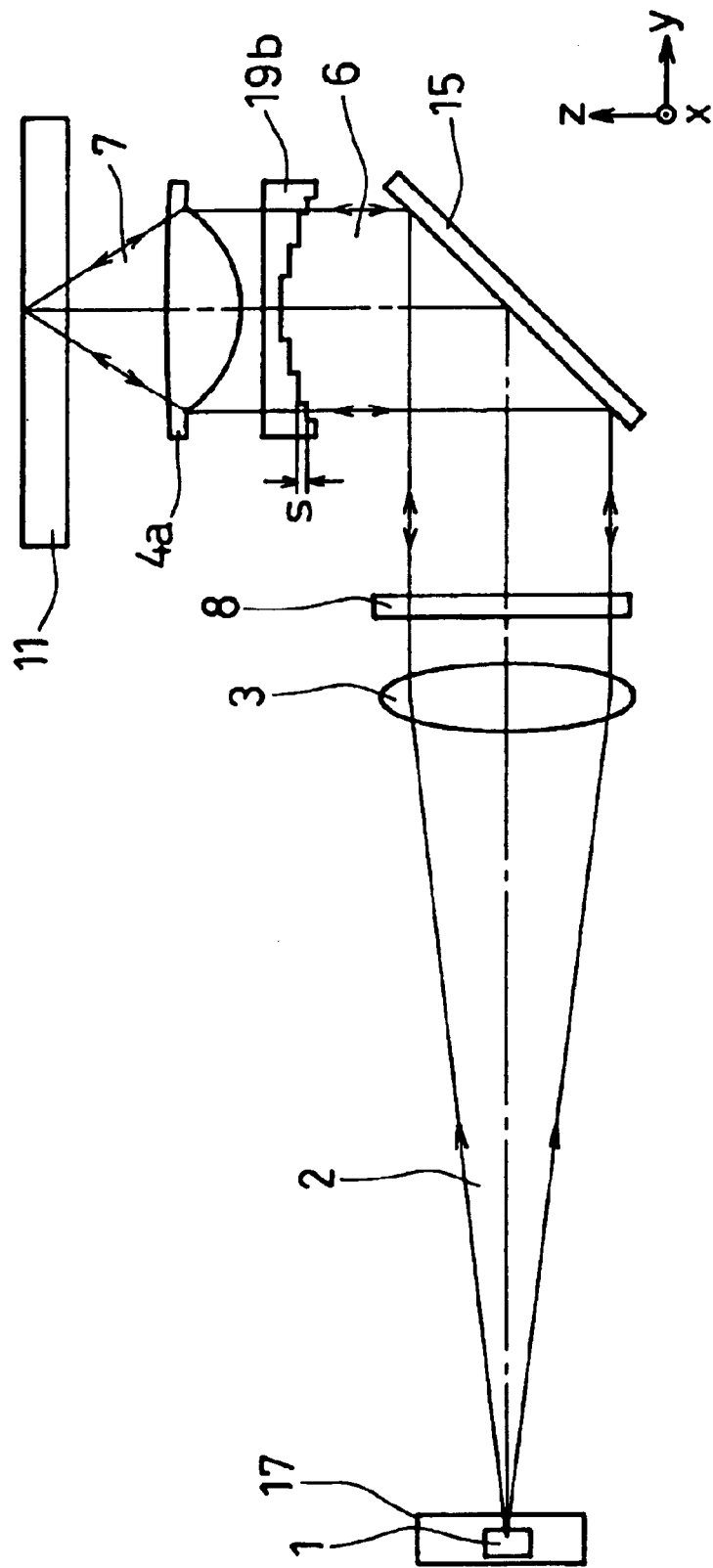
FIG. 10 is a side view showing the basic structure of an optical head and the manner of light transmission in the optical head according to a seventh embodiment of the present invention.

FIG. 10 is a side view showing the basic configuration of the optical head and the manner of light transmission in the optical head according to the seventh embodiment of the present invention.

In the present embodiment, a chromatic-aberration compensation element 19b for compensating chromatic aberration caused by an objective lens 4a is positioned in the optical path between a mirror 15 for bending an optical path and the objective lens 4a.

The element 19b has a typical patterned form of a diffractive lens in which a period is shortened gradually toward its circumference. The element 19b has a step-like cross section as shown in FIG. 10. With respect to a first wavelength $\lambda_1$, a second wavelength $\lambda_2$ that is approximately twice as long as the first wavelength, and a refractive index n of a material of the element 19b, a minimum difference s in level of the step-like shape is set to be substantially in a range between $s_1=2\lambda_1/(n-1)$ and $s_2=\lambda_2/(n-1)$. In this case, excellent light utilization efficiency can be obtained for both the beams with the first and the second wavelengths. In the case of incident lights with the first and the second wavelengths $\lambda_1$ and $\lambda_2$ that are equivalent to the design wavelengths, phase differences between incident light and outgoing light are substantially $4\pi$ and $2\pi$. Consequently, as in the case where no element 19b is provided, almost parallel beams 6 with the first and the second wavelengths pass through the element 19b without being diffracted. However, when the wavelengths of the incident lights are deviated from the design wavelengths, the phase differences due to the difference in level are varied from $4\pi$ and $2\pi$, respectively. Consequently, as in the above-mentioned sixth embodiment, the parallel beam becomes diverging light or converging light. Thus, the element 19b serves to cancel out the variation in focal point of the objective lens 4a.

Eighth Embodiment

Figure 11:
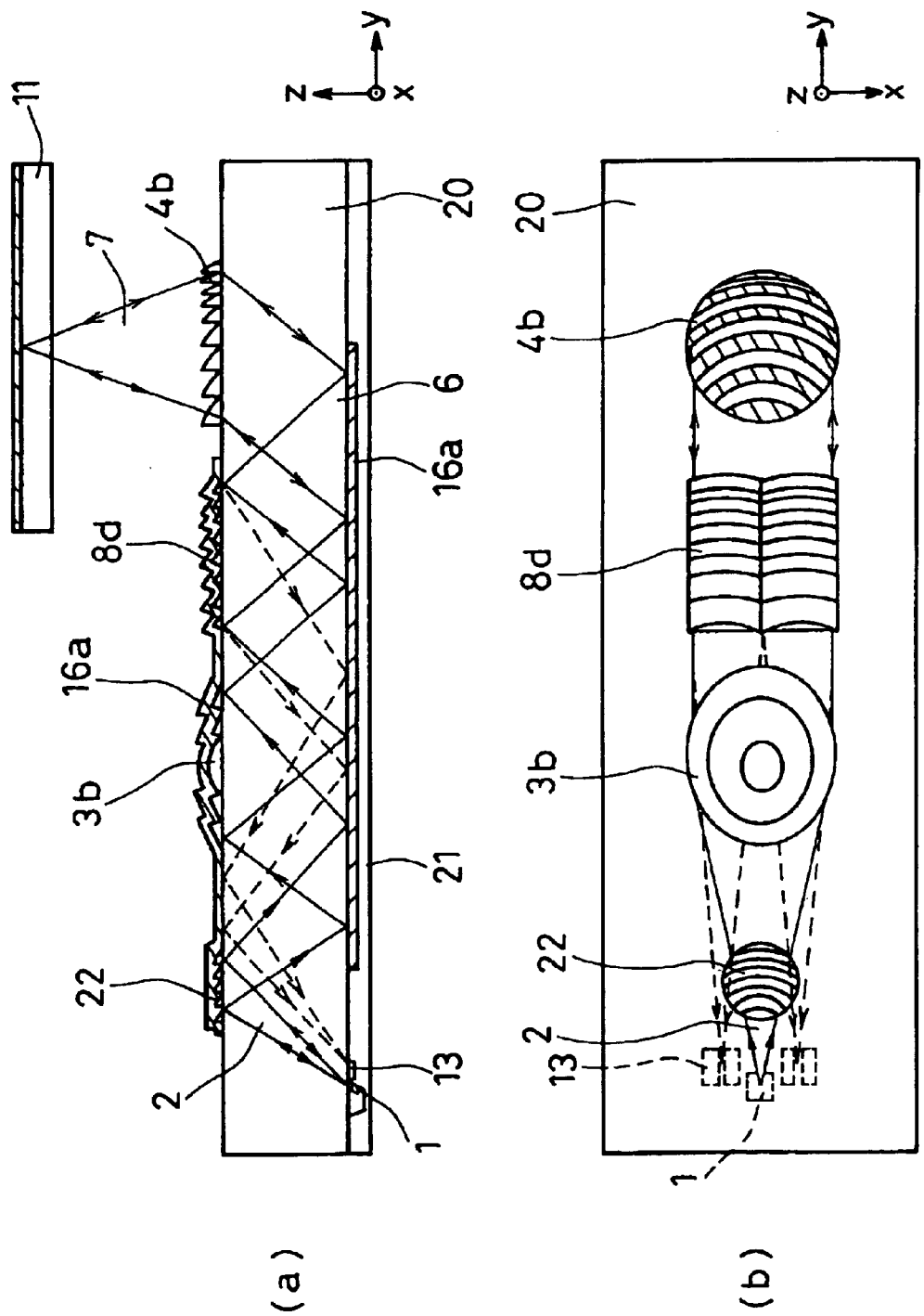
FIG. 11(a) is a side view showing the basic structure of an optical head and the manner of light transmission in the optical head according to an eighth embodiment of the present invention.
FIG. 11(b) is a plane view showing the basic structure of the optical head and the manner of light transmission in the optical head according to the eighth embodiment of the present invention.

An optical head according to a eighth embodiment of the present invention is described with reference to FIG. 11, with emphasis on differences with, respect to one according to the above-mentioned first embodiment.

FIG. 11(a) is a side view showing the basic configuration of the optical head and the manner of light transmission in the optical head according to the eighth embodiment of the present invention. FIG. 11(b) is a plane view showing the basic configuration of the optical head and the manner of light transmission in the optical head according to the eighth embodiment of the present invention.

The optical head of the present embodiment is provided with a transparent substrate 20 in which beams with a first and a second wavelengths propagate in a zigzag manner and a plurality of diffractive optical elements 4b, 8d, 3b, and 22 are positioned on the transparent substrate 20.

As in the aforementioned first embodiment, outgoing light from an off-axis diffraction objective lens 4b and a reflection diffraction collimator lens 3b is substantially a second-order diffraction light with respect to the beam with the first wavelength and is substantially a first-order diffraction light with respect to the beam with the second wavelength that is approximately twice as long as the first wavelength. The objective lens 4b is a transmission element with a cross section substantially of a sawtooth shape and the collimator lens 3b is a reflection element (light incidence from a substrate side) with a cross section substantially of a sawtooth shape. In this case, with respect to the first wavelength $\lambda_1$, the second wavelength $\lambda_2$, and a refractive index n of a material of the objective lens 4b, when groove depth L in the sawtooth shape of the objective lens 4b is set to be substantially in a range between $L_1=2\lambda_1/(n-1)$ and $L_2=\lambda_2/(n-1)$, and when groove depth L in the sawtooth shape of the collimator lens 3b is set to be substantially in the range between $L_1=\lambda_1/n$ and $L_2=\lambda_2/2n$, high diffraction efficiency can be obtained for both the beams with the first and the second wavelengths.

On the backside of the transparent substrate 20 formed of, for example, glass with a thickness of 3 mm, a light source 1 is positioned. The light source 1 selectively emits a beam with a first wavelength $\lambda_1$ satisfying a relationship of, for example, $0.35\ \mu m \leq \lambda_1 \leq 0.44\ \mu m$ and a beam with a second wavelength $\lambda_2$ satisfying a relationship of, for example, $0.76\ \mu m \leq \lambda_2 \leq 0.88\ \mu m$. The light source 1 is mounted on a slant face of an upside-down trapezoidal cavity formed by anisotropic etching in a silicon substrate 21 and therefore a beam 2 emitted from the light source 1 enters the transparent substrate 20 from oblique directions. The beam 2 that has entered the transparent substrate 20 becomes propagation light and then is incident onto a diffractive wavelength stabilization element 22. In this case, a part, for example, several % to about 10% of a first-order or second-order diffraction light having a selected wavelength is returned to the light source 1 for wavelength stabilization. In addition, a zero-order diffraction light propagates within the transparent substrate 20 in a zigzag manner. On parts of the upper and lower surfaces of the substrate 20 and the surfaces of the diffractive optical elements 22, 3b, and 8d, reflection films 16a are formed. The reflection films 16a are formed of, for example, a metal layer of Ag, Al, Au, or the like, or a dielectric multilayer film. The beam 2 that has propagated within the substrate 20 in a zigzag manner is collimated into an almost parallel beam 6 by the collimator lens 3b and is focused (converging light 7) on an optical disk 11 by the objective lens 4b. The light 7 reflected from the optical disk 11 returns in the opposite direction to enter the substrate 20 again from the objective lens 4b to become propagation light 6 and then is incident onto a reflection twin lens 8d serving as a focusing/tracking error signal detection element. The twin lens 8d has a structure in which two reflection lenses with the same specification are arranged in an array manner.

The propagation light is divided into two lights by the twin lens 8d, and the divided lights propagate within the substrate 20 in a zigzag manner and then are focused on a photodetector 13 formed on the silicon substrate 21.

Respective gratings of the collimator lens 3b and respective gratings of one reflection lens that is a part of the twin lens 8d in the present embodiment have elliptic shapes having the same eccentricity and major axes in the y-axis direction that is the optical-axial direction of propagation light. The period of the gratings is shortened gradually toward their outer circumferences. The center positions of the elliptic patterns are shifted to one side that is selected from a light-incident side and a light-outgoing side of the lenses and that is nearer to the parallel beam (in the y-axis direction in the lens 3b and in the negative y-axis direction in the lens 8d) gradually toward their outer circumferences. By forming the collimator lens 3b in such a shape, the aberrations of coma and astigmatism that usually occur due to the influence of oblique incidence can be eliminated, thus collimating beams excellently.

The off-axis transmission diffraction optical lens used as the transmission objective lens 4b in the present embodiment is formed of a curved grating that has the period shortened gradually in the traveling direction (the y-axis direction) of beams and that is a part of ellipses whose curvatures and center positions are varied gradually.

The present embodiment employs the configuration in which respective optical components are positioned on the transparent substrate 20, thus obtaining an optical head in which position adjustment is facilitated and its size and weight can be reduced. Furthermore, the four diffractive optical elements 22, 3b, 8d, and 4b have groove depths set to be almost equal to the wavelength of light to be used and therefore can be manufactured at the same time, for example, by injection molding or a 2P method. In addition, their relative positions can be set precisely and costs can be reduced at the same time.

Ninth Embodiment

An optical head according to a ninth embodiment of the present invention is described with reference to FIG. 12, with emphasis on differences with respect to one according to the above-mentioned first embodiment.

Figure 12:
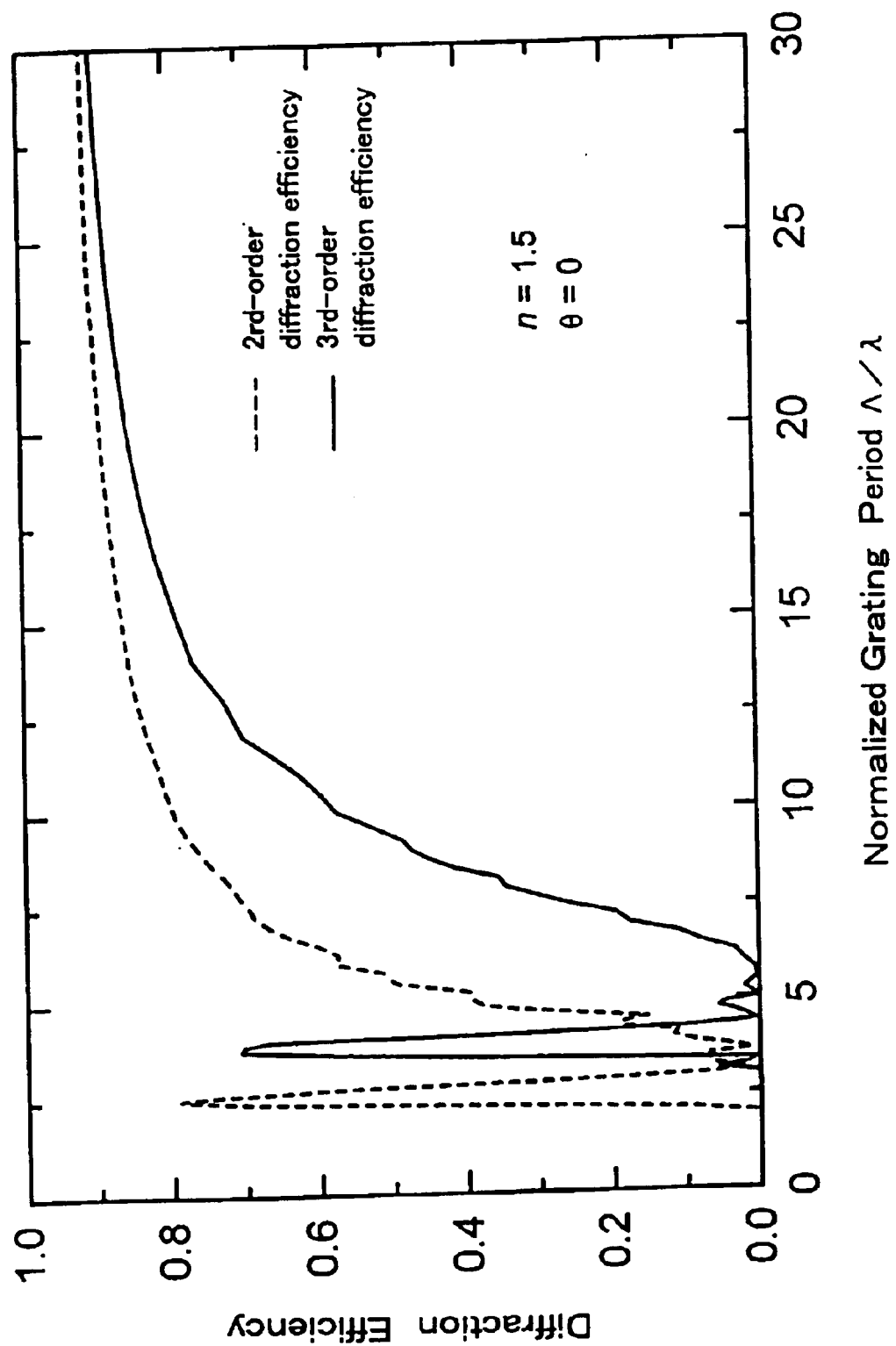
FIG. 12 is a graph showing the relationship between a normalized grating period and diffraction efficiency of a diffractive optical element in an optical head according to a ninth embodiment of the present invention.

FIG. 12 is a graph showing the relationship between diffraction efficiency and a normalized grating period $\Lambda/\lambda$ normalized by a wavelength $\lambda$ of a diffractive optical element in the optical head according to the ninth embodiment of the present invention.

The optical head of the present embodiment is different from one according to the first embodiment in wavelength of beams emitted from a light source and in groove depth of the diffractive optical element. The optical head according to the present embodiment comprises at least one light source and at least one diffractive optical element. The light source emits a beam with a first wavelength and a beam with a second wavelength that is approximately 1.5 times as long as the first wavelength. The diffractive optical element is provided in optical paths of the beams with the first and the second wavelengths. Outgoing light from the diffractive optical element is substantially a third-order diffraction light with respect to the beam with the first wavelength and substantially a second-order diffraction light with respect to the beam with the second wavelength.

In the optical head according to the present embodiment, the wavelength of a beam with the first wavelength $\lambda_1$ emitted from the light source satisfies substantially a relationship of, for example, $0.35\ \mu m \leq \lambda_1 \leq 0.44\ \mu m$, and by mounting a light source emitting beams with this first wavelength $\lambda_1$, a small focusing spot can be obtained. As a result, high-density disks having, for example, at least 10 GByte capacity can be read. Further, the wavelength of a beam with the second wavelength $\lambda_2$ emitted from the light source satisfies a relationship of, for example, $0.57\ \mu m \leq \lambda_2 \leq 0.68\ \mu m$, and by mounting a light source emitting beams with this second wavelength $\lambda_2$, optical disks such as DVDs or DVD-Rs including a two-layer structure can be read.

The inventors of the present invention found that in the optical head emitting beams of two wavelengths that read both the high-density optical disks and the optical disks such as DVDs or DVD-Rs, wherein the two wavelengths were set so that one wavelength was approximately 1.5 times (practically, about 1.4 times to about 1.7 times) as long as the other, even when the diffractive optical element was positioned in an optical path common to both the beams with the first and the second wavelengths, high diffraction efficiency for the both was attained and an optical head with excellent optical characteristics was obtained by using substantially a third-order diffraction light out of outgoing lights from the diffractive optical element when the optical head read high-density optical disks (when emitting the beam with the first wavelength) and substantially a second-order diffraction light out of outgoing lights from the diffractive optical element when the optical head read optical disks such as DVDs or DVD-Rs (when emitting the beam with the second wavelength).

Usually, a diffraction angle in a diffractive optical element is determined depending on a wavelength of light being incident onto the diffractive optical element, a period of the diffractive optical element, and a diffraction order. However, the inventors of the present invention found that even when beams with different wavelengths were used, almost equal diffraction angles were obtained by using substantially a third-order diffraction light with respect to the beam with the first wavelength and substantially a second-order diffraction light with respect to the beam with the second wavelength that was approximately 1.5 times as long as the first wavelength.

The diffractive optical element has a cross section substantially of a sawtooth shape. In this case, with respect to the first wavelength $\lambda_1$, the second wavelength $\lambda_2$, and a refractive index n of a material of the diffractive ma optical element, groove depth L in the sawtooth shape is set to be substantially in a range between $L_1=3\lambda_1/(n-1)$ and $L_2=2\lambda_2(n-1)$ in the case of a transmission element, substantially in a range between $L_1=3\lambda_1/2n$ and $L_2=\lambda_2/n$ in the case of a reflection element onto which beams are incident from a substrate side, and substantially in a range between $L_1=3\lambda_1/2$ and $L_2=\lambda_2$ in the case of a reflection element onto which beams are incident from an air side, thus obtaining maximum diffraction efficiency for both wavelengths. For example, if $\lambda_1=0.40\ \mu m$, $\lambda_2=0.65\ \mu m$, and n=1.5, then L=2.4 $\mu m$–2.6 $\mu m$ in the transmission element, and L=0.40 $\mu m$–0.43 $\mu m$ (light incidence from a substrate side) and 0.60 $\mu m$–0.65 $\mu m$ (light incidence from an air side) in the reflection element.

In addition, a diffractive optical element with a multilevel-shaped cross section approximated to the sawtooth-shaped cross section in the present embodiment using a step-like shape also can be used. In this case, it is preferable that an optimum total groove depth is substantially in a range between $L_1=3(p-1)\lambda_1/[p\ (n-1)]$ and $L_2=2(p-1)\lambda_2/[p\ (n-1)]$ in the case of a transmission element, is substantially in a range between $L_1=3(p-1)\lambda_1/2pn$ and $L_2=(p-1)\lambda_2/pn$ in the case of a reflection element onto which beams are incident from a substrate side, and is substantially in a range between $L_1=3(p-1)\lambda_1/2p$ and $L_1=(p-1)\lambda_2/p$ in the case of a reflection element onto which beams are incident from an air side, wherein p indicates the number of levels.

As in the present embodiment, if $1.5\lambda_2=\lambda_2$ does not hold perfectly, then $L_1 \neq L_2$, and a preferable groove depth is in a range between $L_1$ and $L_2$. However, when the groove depth is $L_1$, the efficiency for the beam with the first wavelength $\lambda_1$ is given much weight, and when the groove depth is $L_2$, the efficiency for the beam with the second wavelength $\lambda_2$ is given much weight. Therefore, when the groove depth is exactly the average of them ($0.5(L_1+L_2)$), the efficiencies for both beams with the first and the second wavelengths are brought into balance. The shorter the wavelength is, the more the light utilization efficiency is important. Consequently, it is more to preferable to set the groove depth of the diffractive optical element to be $L_1$.

As can be seen from FIG. 12, the second-order diffraction efficiency is better than the third-order diffraction efficiency, but both the diffraction efficiencies tend to decrease as the period $\Lambda/\lambda$ becomes smaller. When the period $\Lambda/\lambda$ is 16 or more, at least 80% of diffraction efficiency can be obtained for both the wavelengths. Therefore, by enabling the minimum period $\Lambda_{min}$ of the diffractive optical element to satisfy a relationship of $\Lambda_{min} \geq 16 \lambda_1$ with respect to the first wavelength $\lambda_1$, a diffraction efficiency of at least 80% can be obtained for both the wavelengths.

Tenth Embodiment

An optical head according to a tenth embodiment of the present invention is described with reference to FIG. 13, with emphasis on differences with respect to one according to the above-mentioned first embodiment.

Figure 13:
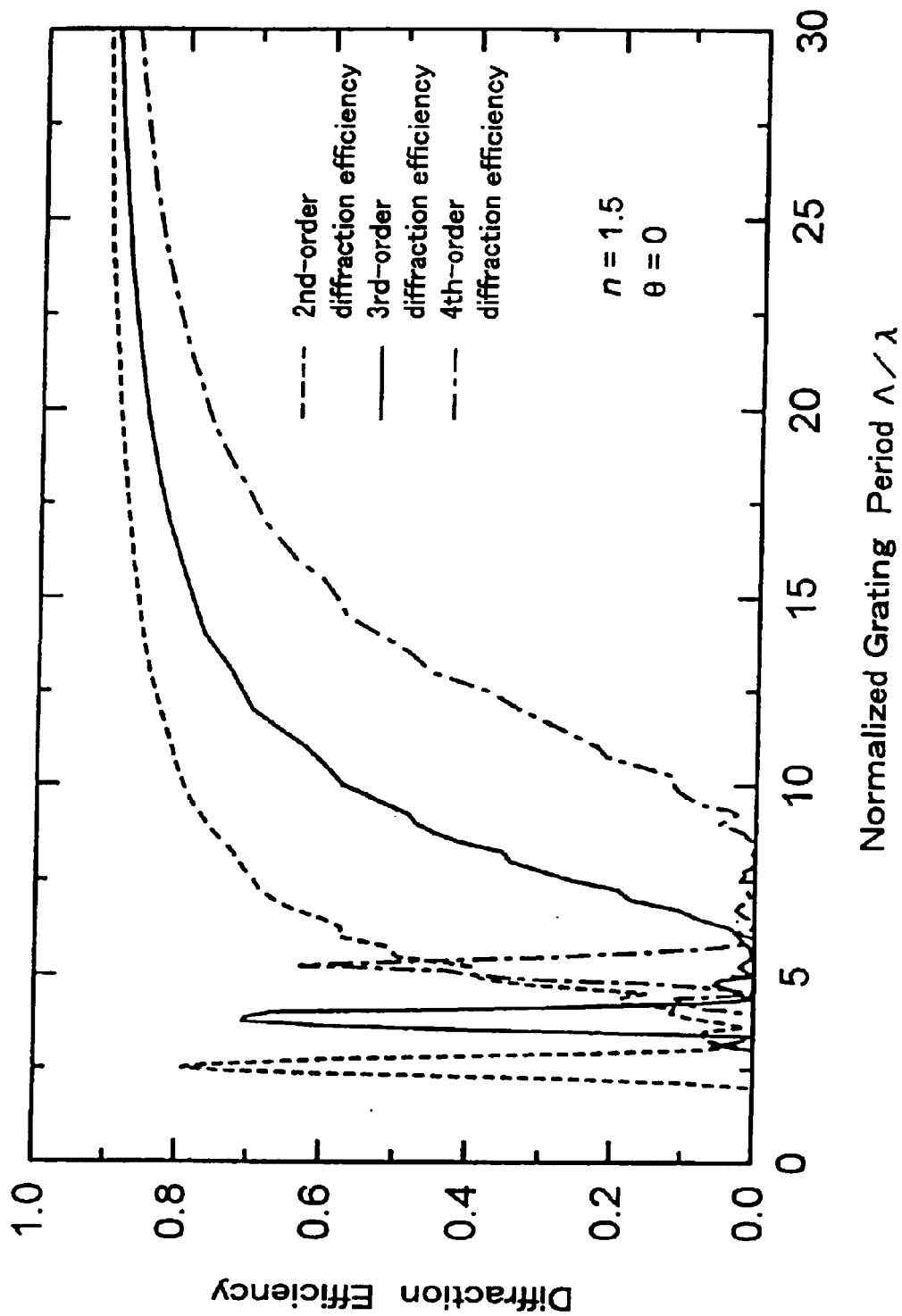
FIG. 13 is a graph showing the relationship between a normalized grating period $\Lambda/\lambda$ and diffraction efficiency of a diffractive optical element in an optical head according to a tenth embodiment of the present invention.
Figure 14:
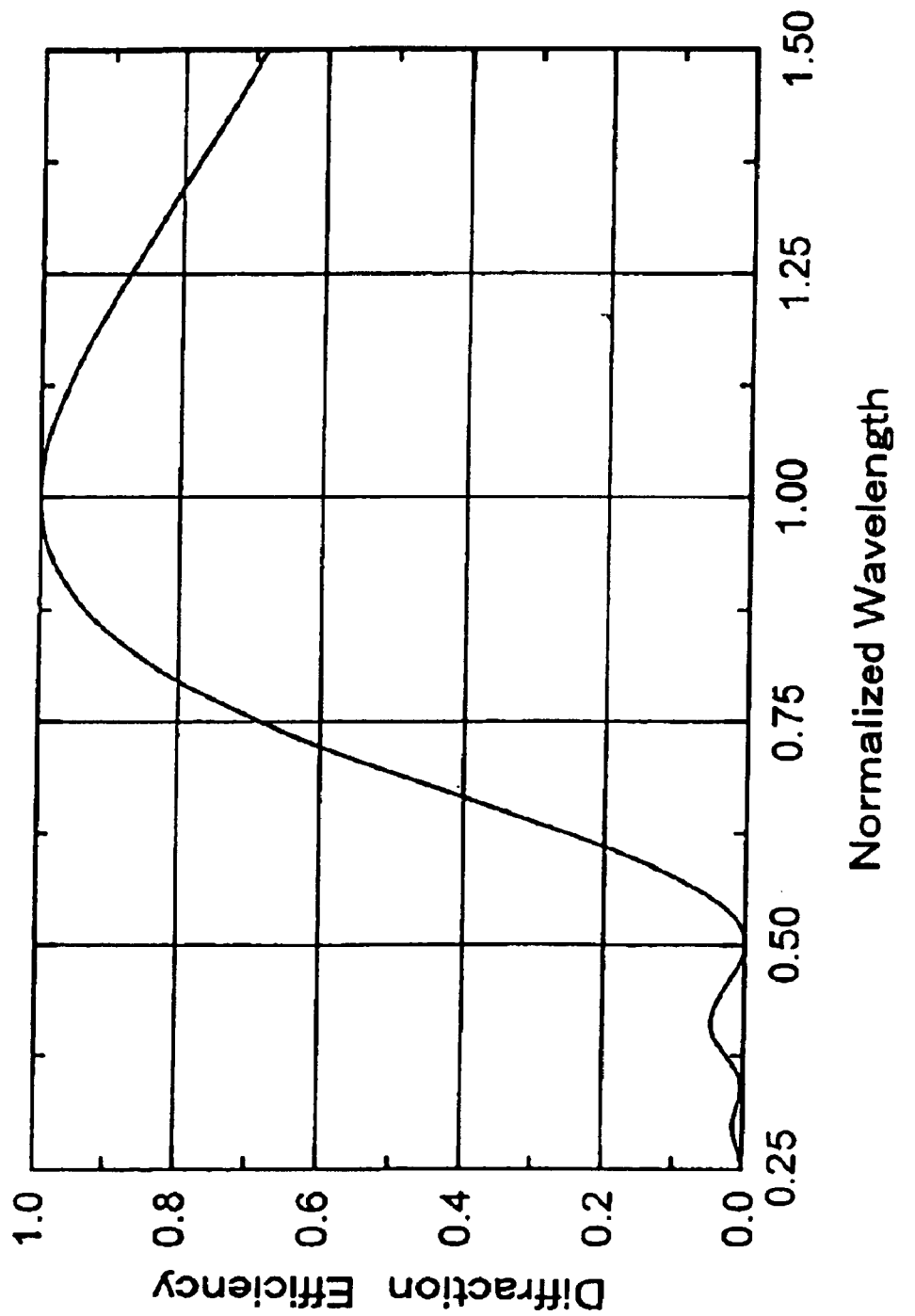
FIG. 14 is a graph showing the relationship between a normalized wavelength and first-order diffraction efficiency of a diffractive optical element in a conventional optical head.

FIG. 13 is a graph showing the relationship between diffraction efficiency and a normalized grating period $\Lambda/\lambda$ normalized by a wavelength $\lambda$ of a diffractive optical element in the optical head according to the tenth embodiment of the present invention.

The optical head according to the present embodiment is different from one according to the first embodiment in wavelength of beams emitted from a light source and in groove depth of the diffractive optical element. The optical head of the present embodiment includes at least one light source, a photodetector, and at least one diffractive optical element. The light source emits a beam with a first wavelength, a beam with a second wavelength that is approximately twice as long as the first wavelength, and a beam with a third wavelength that is approximately 1.5 times as long as the first wavelength. The diffractive optical element is provided in optical paths of the beams with the first, the second, and the third wavelengths. Outgoing light from the diffractive optical element is substantially a fourth-order diffraction light with respect to the beam with the first wavelength, is substantially a second-order diffraction light with respect to the beam with the second wavelength, and is substantially a third-order diffraction light with respect to the beam with the third wavelength.

In the optical head of the present embodiment, the wavelength of a beam with the first wavelength $\lambda_1$ emitted from the light source satisfies substantially a relationship of, for example, $0.35 \mu m \leq \lambda_1 \leq 0.44 \mu m$, and by mounting a light source emitting beams with this first wavelength $\lambda_1$, a small focusing spot can be obtained. As a result, high-density disks with, for example, at least 10 GByte capacity can be read. The wavelength of a beam with the second wavelength $\lambda_2$ emitted from the light source satisfies substantially a relationship of, for example, $0.571 \mu m \leq \lambda_2 \leq 0.68 \mu m$, and by mounting a light source emitting beams with this second wavelength $\lambda_2$, optical disks such as CDs or CD-Rs can be read. Further, the wavelength of a beam with the third wavelength $\lambda_3$ emitted from the light source satisfies substantially a relationship of, for example, $0.76 \mu m \leq \lambda_3 \leq 0.88 \mu m$, and by mounting a light source emitting beams with this third wavelength $\lambda_3$, optical disks such as DVDs or DVD-Rs including a two-layer structure can be read.

The inventors of the present invention found that in the optical head emitting beams with the first, the second, and the third wavelengths that read both high-density optical disks and various optical disks such as DVDs, DVD-Rs, CDs, or CD-Rs, wherein the ratio of the three wavelengths was set to be about 1:2:1.5 (practically, 1:1.8–2.1:1.4–1.7), even when the diffractive optical element was positioned in an optical path common to the beams with the three wavelengths, high diffraction efficiency was obtained particularly for the beams with the first and the second wavelengths out of the beams with the three wavelengths and an optical head with excellent optical characteristics was obtained by using substantially a fourth-order diffraction light out of outgoing lights from the diffractive optical element when the optical head read high-density optical disks (when emitting the beam with the first wavelength), substantially a second-order diffraction light out of outgoing lights from the diffractive optical element when the optical head read optical disks such as CDs or CD-Rs (when emitting the beam with the second wavelength), and substantially a third-order diffraction light out of outgoing lights from the diffractive optical element when the optical head read optical disks such as DVDs or DVD-Rs (when emitting the beam with the third wavelength). In this case, the diffraction efficiency for the beam with the third wavelength decreases, for example, only about 5% compared to that for the beams with the first and the second wavelengths.

Usually, a diffraction angle in a diffractive optical element is determined depending on a wavelength of light being incident onto the diffractive optical element, a period of the diffractive optical element, and a diffraction order. However, the inventors of the present invention found that even when beams with different wavelengths were used, almost equal diffraction angles were obtained by using substantially a fourth-order diffraction light with respect to the beam with the first wavelength, substantially a second-order diffraction light with respect to the beam with the second wavelength, and substantially a third-order diffraction light with respect to the beam with the third wavelength.

The diffractive optical element has a cross section substantially of a sawtooth shape. In this case, with respect to the first wavelength $\lambda_1$, the second wavelength $\lambda_2$, the third wavelength $\lambda_3$ and a refractive index n of a material of the diffractive optical element, groove depth L in the sawtooth-shape is set to be substantially in a range between a minimum and a maximum among $L_1=4\lambda_1/(n-1)$, $L_2=2\lambda_2/(n-1)$, and $L_3=3\lambda_3(n-1)$ in the case of a transmission element, substantially in a range between a minimum and a maximum among $L_1=2\lambda_1/n$, $L_2=\lambda_2/n$, and $L_3=3\lambda_3/2n$ in the case of a reflection element onto which beams are incident from a substrate side, and substantially in a range between a minimum and a maximum among $L_1=2\lambda_1$, $L_2=\lambda_2$, and $L_3=3\lambda_3/2$ in the case of a reflection element onto which beams are incident from an air side, thus obtaining maximum diffraction efficiency for all the three wavelengths. For example, if $\lambda_1=0.40 \mu m$, $\lambda_2=0.80 \mu m$, $\lambda_3=0.65 \mu m$, and n=1.5, then $L=3.2 \mu m$–$3.9 \mu m$ in the transmission element, and $L=0.53 \mu m$–$0.65 \mu m$ (light incidence from a substrate side) and $0.80 \mu m$–$0.98 \mu m$ (light incidence from an air side) in the reflection element.

In addition, a diffractive optical element with a multilevel-shaped cross section approximated to the sawtooth-shaped cross section in the present embodiment using a step-like shape also can be used. In this case, an optimum total groove depth is substantially in a range between a minimum and a maximum among $L_1=4(p-1)\lambda_1[p\ (n-1)]$, $L_2=2(p-1)\lambda_2/[p\ (n-1)]$, and $L_3=3(p-1)\lambda_3[p(n-1)]$ in the case of a transmission element, is substantially in a range between a minimum and a maximum among $L_1=2(p-1)\lambda_1/pn$, $L_2=(p-1)\lambda_2/pn$, and $L_3=3(p-1)\lambda_3/2pn$ in the case of a reflection element onto which beams are incident from a substrate side, and is substantially in a range between a minimum and a maximum among $L_1=2(p-1)\lambda_1/p$, $L_2=(p-1)\lambda_2/p$, and $L_3=3(p-1)\lambda_3/2p$ in the case of a reflection element onto which beams are incident from an air side, wherein p indicates the number of levels.

As can be seen from FIG. 13, the second-order diffraction efficiency is better than the third-order and fourth-order diffraction efficiencies, but all the three diffraction efficiencies tend to decrease as the period $\Lambda/\lambda$ is shortened. When the period $\Lambda/\lambda$ is 22 or more, at least 80% of diffraction efficiency can be obtained for all the three wavelengths. Therefore, by enabling the minimum period $\Lambda_{min}$ of the diffractive optical element to satisfy a relationship of $\Lambda_{min} \geq 22\ \lambda_1$ with respect to the first wavelength $\lambda_1$, a diffraction efficiency of at least 80% can be obtained for all the three wavelengths.

Eleventh Embodiment

An optical head according to an eleventh embodiment of the present invention is described, with emphasis on differences with respect to one according to the above-mentioned tenth embodiment.

The optical head of the present embodiment is different from one according to the tenth embodiment in groove depth of the diffractive optical element and in diffraction order to be used. The optical head of the present embodiment is provided with at least one light source, a photodetector, and at least one diffractive optical element. The light source emits a beam with a first wavelength, a beam with a second wavelength that is approximately twice as long as the first wavelength, and a beam with a third wavelength that is approximately 1.5 times as long as the first wavelength. The diffractive optical element is provided in optical paths of the beams with the first, the second, and the third wavelengths. Outgoing light from the diffractive optical element is substantially a sixth-order diffraction light with respect to the beam with the first wavelength, is substantially a third-order diffraction light with respect to the beam with the second wavelength, and is substantially a fourth-order diffraction light with respect to the beam with the third wavelength.

In the optical head of the present embodiment, the wavelength of a beam with the first wavelength $\lambda_1$ emitted from the light source satisfies substantially a relationship of, for example, $0.35\ \mu m \leq \lambda_1 \leq 0.44\ \mu m$, and by mounting a light source emitting beams with this first wavelength $\lambda_1$, a small focusing spot can be obtained. As a result, high-density disks with, for example, at least 10 GByte capacity can be read. The wavelength of a beam with the second wavelength $\lambda_2$ emitted from the light source satisfies to substantially a relationship of, for example, $0.57\ \mu m \leq \lambda^2 \leq 0.68\ \mu m$, and by mounting a light source emitting beams with this second wavelength $\lambda_2$, optical disks such as CDs or CD-Rs can be read. Further, the wavelength of a beam with the third wavelength $\lambda_3$ emitted from the light source satisfies substantially a relationship of, for example, $0.7\ \mu m \leq \lambda_2 \leq 0.88\ \mu m$, and by mounting a light source emitting beams with this third wavelength $\lambda_3$, optical disks such as DVDs or DVD-Rs including a two-layer structure can be read.

The inventors of the present invention found that in the optical head emitting beams with three wavelengths that can read both high-density optical disks and various optical disks such as DVDs, DVD-Rs, CDs, or CD-Rs, wherein the ratio of the three wavelengths was set to be about 1: 2:1.5 (practically, 1:1.8–2.1:1.4–1.7), even when the diffractive optical element was positioned in an optical path common to the beams with the three wavelengths, high diffraction efficiency were obtained for all the beams with the three wavelengths by using substantially a sixth-order diffraction light out of outgoing lights from the diffractive optical element when the optical head read the high-density optical disks (when emitting the beam with the first wavelength), substantially a third-order diffraction light out of outgoing lights from the diffractive optical element when the optical head read optical disks such as CDs or CD-Rs (when emitting the beam with the second wavelength), and substantially a fourth-order diffraction light out of outgoing lights from the diffractive optical element when the optical head read optical disks such as DVDs or DVD-Rs (when emitting the beam with the third wavelength).

In the diffractive optical element of the present embodiment, higher diffraction orders than those in the diffractive optical element of the tenth embodiment are used. Particularly, when the period of the diffractive optical element is large, higher diffraction efficiency for the beam with the third wavelength can be obtained in the diffractive optical element of the present embodiment compared to that in the diffractive optical element of the tenth embodiment.

The diffractive optical element has a cross section substantially of a sawtooth shape. In this case, with respect to the first wavelength $\lambda_1$, the second wavelength $\lambda_2$, the third wavelength $\lambda_3$, and a refractive index n of a material of the diffractive optical element, groove depth L in the sawtooth shape is set to be substantially in a range between a minimum and a maximum among $L_1=6\lambda_1/(n-1)$, $L_2=3\lambda_2/(n-1)$, and $L_3=4\lambda_3/(n-1)$ in the case of a transmission element, substantially in a range between a minimum and a maximum among $L_1=3\lambda_1/n$, $L_2=3\lambda_2/2n$, and $L_3=2\lambda_3/n$ in the case of a reflection element onto which beams are incident from a substrate side, and substantially in a range between a minimum and a maximum among $L_1=3\lambda_1$, $L_2=3\lambda_2/2$, and $L_3=2\lambda_3$ in the case of a reflection element onto which beams are incident from an air side, thus obtaining maximum diffraction efficiency for all the three wavelengths. For example, if $\lambda_1=0.40\ \mu m$, $\lambda_2=0.80\ \mu m$, $\lambda_3=0.65\ \mu m$, and $n=1.5$, then $L=4.8\ \mu m$–$5.21\ \mu m$ in the transmission element, and $L=0.80\ \mu m$–$0.87\ \mu m$ (light incidence from a substrate side) and $1.2\ \mu m$–$1.3\ \mu m$ (light incidence from an air side) in the reflection element.

In addition, a diffractive optical element having a multilevel-shaped cross section approximated to the sawtooth-shaped cross section in the present embodiment using a step-like shape also can be used. In this case, in view of excellent light utilization efficiency, it is preferable that an optimum total groove depth is substantially in a range between a minimum and a maximum among $L_1=6(p-1)\lambda_1/[p\ (n-1)]$, $L_2=3(p-1)\lambda_2/[p\ (n-1)]$, and $L_3=2(p-1)\lambda_3/[p\ (n-1)]$ in the case of a transmission element, is substantially in a range between a minimum and a maximum among $L_1=3(p-1)\lambda_1/pn$, $L_2=3(p-1)\lambda_2/2pn$, and $L_3=(p-1)\lambda_3/pn$ in the case of a reflection element onto which beams are incident from a substrate side, and is substantially in a range between a minimum and a maximum among $L_1=3(p-1)\lambda_1/p$, $L_2=3(p-1)\lambda_2/2p$, and $L_3=(p-1)\lambda_3/p$ in the case of a reflection element onto which beams are incident from an air side, wherein p indicates the number of levels.

Twelfth Embodiment;

An optical head according to a twelfth embodiment of the present invention is described, with emphasis on differences with respect to one according to the above-mentioned fifth or sixth embodiment.

The optical head of the present embodiment is different from one according to the fifth or sixth embodiment in wavelength of beams emitted from a light source and groove depth in a chromatic-aberration compensation element.

The optical head of the present embodiment includes: at least one light source that emits a beam with a first wavelength and a beam with a second wavelength that is approximately 1.5 times as long as the first wavelength; a photodetector; an objective lens for focusing beams on an information recording medium; and a diffractive optical element provided in optical paths of the beams with the first and the second wavelengths. The diffractive optical element is a chromatic-aberration compensation element having difference in level of a step-like shape or grooves substantially of a sawtooth shape for compensating chromatic aberration caused by the objective lens. With respect to the first wavelength $\lambda_1$, the second wavelength $\lambda_2$, and the refractive index n of a material of the chromatic-aberration compensation element, the difference in level or the groove depth is substantially in a range between $3\lambda_1/(n-1)$ and $2\lambda_2/(n-1)$.

According to the configuration of the present embodiment, a chromatic-aberration compensation element with excellent light utilization efficiency for the beams with the first and the second wavelengths can be obtained.

In the optical head of the present embodiment, the wavelength of a beam with the first wavelength $\lambda_1$ emitted from the light source satisfies substantially a relationship of, for example, $0.35 \mu m \leq \lambda_1 \leq 0.44 \mu m$, and by mounting a light source emitting beams with this first wavelength $\lambda_1$, a small focussing spot can be obtained. As a result, high-density disks with, for example, at least 10 GByte capacity can be read. Further, the wavelength of a beam with the second wavelength $\lambda_2$ emitted from the light source satisfies substantially a relationship of, for example, $0.57 \mu m \leq \lambda_2 \leq 0.68 \mu m$, and by mounting a light source emitting beams with this second wavelength $\lambda_2$, optical disks such as DVDs or DVD-Rs including a two-layer structure can be read.

Thirteenth Embodiment

An optical head according to a thirteenth embodiment of the present invention is described, with emphasis on differences with respect to one according to the above-mentioned fifth, sixth, or seventh embodiment.

The optical head of the present embodiment is different from one according to the fifth or sixth embodiment in wavelength of beams emitted from a light source and groove depth in a chromatic-aberration compensation element.

The optical head of the present embodiment includes: at least one to light source that emits a beam with a first wavelength, a beam with a second wavelength that is approximately twice as long as the first wavelength, and a beam with a third wavelength that is approximately 1.5 times as long as the first wavelength; a photodetector; an objective lens for focusing beams on an information recording medium; and at least one diffractive optical element that is provided in optical paths of the beams with the first, the second, and the third wavelengths. The diffractive optical element is a chromatic-aberration compensation element having difference in level of a step-like shape or grooves substantially of a sawtooth shape for compensating chromatic aberration caused by the objective lens. With respect to the first wavelength $\lambda_1$, the second wavelength $\lambda_2$, the third wavelength $\lambda_3$, and a refractive index n of a material of the diffractive optical element, the difference in level or the groove depth is in a range between a minimum and a maximum among $4\lambda_1/(n-1)$, $2\lambda_2/(n-1)$, and $3\lambda_3/(n-1)$.

According to the configuration of the present embodiment, a chromatic-aberration compensation element having optical characteristics of excellent light utilization efficiency particularly for the beams with the first and the second wavelengths out of the beams with the first to the third wavelengths can be obtained.

In the optical head of the present embodiment, the wavelength of a beam with the first wavelength $\lambda_1$ emitted from the light source satisfies substantially a relationship of, for example, $0.35 \mu m \leq \lambda_1 \leq 0.44 \mu m$, and by mounting a light source emitting beams with this first wavelength $\lambda_1$, a small focusing spot can be obtained. As a result, high-density disks with, for example, at least 10 GByte capacity can be read. Further, the wavelength of a beam with the second wavelength $\lambda_2$ emitted from the light source satisfies substantially a relationship of, for example, $0.57 \mu m \leq \lambda_2 \leq 0.68 \mu m$, and by mounting a light source emitting beams with this second wavelength $\lambda_2$, optical disks such as DVDs ir DVD-Rs including a two-layer structure can be read.

Fourteenth Embodiment

An optical head according to a fourteenth embodiment of the present invention is described, with emphasis on differences with respect to one according to the above-mentioned thirteenth embodiment.

The optical head of the present embodiment is different from one according to the thirteenth embodiment in difference in level or groove depth in a chromatic-aberration compensation element.

The optical head of the present embodiment includes: at least one light source that emits a beam with a first wavelength, a beam with a second wavelength that is approximately twice as long as the first wavelength, and a beam with a third wavelength that is approximately 1.5 times as long as the first wavelength; a photodetector; an objective lens for focusing beams on an information recording medium; and at least one diffractive optical element that is provided in optical paths of the beams with the first, the second, and the third wavelengths. The diffractive optical element is a chromatic-aberration compensation element having difference in level of a step-like shape or grooves substantially of a sawtooth shape for compensating chromatic aberration caused by the objective lens. With respect to the first wavelength $\lambda_1$, the second wavelength $\lambda_2$, the third wavelength $\lambda_3$, and a refractive index n of a material of the diffractive optical element, the difference in level or the groove depth is in a range between a minimum and a maximum among $6\lambda_1/(n-1)$, $3\lambda_1/(n-1)$, and $4\lambda_3/(n-1)$.

The chromatic-aberration compensation element in the present embodiment has greater difference in level or groove depth than in the chromatic-aberration element of the thirteenth embodiment. However, when the period of the chromatic-aberration compensation element is sufficiently larger than the wavelengths of light being incident on the chromatic-aberration compensation element, a chromatic-aberration compensation element having optical characteristics of excellent light utilization efficiency for the beams with the first to the third wavelengths can be obtained by being formed according to the present embodiment.

In the optical head of the present embodiment, the wavelength of a beam with the first wavelength $\lambda_1$ emitted from the light source satisfies substantially a relationship of, for example, $0.35 \mu m \leq \lambda_1 \leq 0.44 \mu m$, and by mounting a light source emitting beams with this first wavelength $\lambda_1$, a small focusing spot can be obtained. As a result, high-density disks with, for example, at least 10 GByte capacity can be read. The wavelength of a beam with the second wavelength $\lambda_2$ emitted from the light source satisfies substantially a relationship of, for example, 0.57 $\mu m \leq \lambda_2 \leq 0.68$ $\mu m$, and by mounting a light source emitting beams with this second wavelength $\lambda_2$, optical disks such as CDs or CD-Rs can be read. Further, the wavelength of a beam with the third wavelength $\lambda_3$ emitted from the light source satisfies substantially a relationship of, for example, 0.76 $\mu m \leq \lambda_3 \leq 0.88$ $\mu m$, and by mounting a light source emitting beams with this third wavelength $\lambda_3$, optical disks such as DVDs or DVD-Rs including a two-layer structure can be read.

In the above, the optical heads of the first to fourteenth embodiments were described. However, the present invention is not limited to these embodiments. The present invention includes optical heads in which several configurations of the optical heads according to the above-mentioned embodiments are combined, and such optical heads can provide the same effects.

The objective lens and the collimator lens used in the above-mentioned embodiments have been named so for the sake of convenience, and both refer to what is generally known as a lens.

Further, the above-mentioned embodiments were described using optical disks as examples. However, the application of the present invention to read card-like, drum-like, or tape-like products that have a plurality of different specifications such as thickness, recording density, and the like and that are designed to be read by the same information recording/reproducing apparatus also is included in the range of the present invention.

In the aforementioned embodiments, a plurality of beams with various wavelengths was used. However, an optical head may be designed so as to have only one light source for emitting a beam with a wavelength $\lambda$ that satisfies substantially a relationship of 0.35 $\mu m \leq \lambda \leq 0.44$ $\mu m$ (in the case of using one light source in FIGS. 7 to 10). In this case, when the optical head is further provided with a photodetector and at least one diffractive optical element provided in the optical path of a beam emitted from the light source and when the diffractive optical element is a chromatic-aberration compensation element for compensating chromatic aberration caused by an objective lens focusing the beam on an information recording medium, in the case of using a semiconductor laser beam having a wavelength $\lambda$ in a range of 0.35 $\mu m \leq \lambda 0.44$ $\mu m$ in which great chromatic dispersion is caused by the glass material of a lens, as a beam emitted from the light source, a favorable focusing spot can be obtained on an optical disk surface by compensating the great chromatic aberration caused by the objective lens, even if the central wavelength of the beam emitted from the light source is varied due to the change in environmental temperature or the broadening of the wavelength range of about several nm caused by a high frequency module or self-oscillation. Moreover, in this case, when the chromatic-aberration compensation element is formed on the objective lens, the element and the objective lens can be handled as one component, thus reducing the size and cost of the optical head. In addition, when the element and the objective lens are driven together by an actuator, the optical axes of the element and of the objective lens are not shifted from each other, thus obtaining excellent optical characteristics. Further, when the element is a convex diffractive lens and is designed to form converging light in cooperation with the objective lens, the numerical aperture of the objective lens itself is reduced, thus facilitating the manufacture.

As described above, according to the present invention, optical heads with high light utilization efficiency can be obtained by the configuration having a diffractive optical element and a light source emitting beams with a plurality of wavelengths for reading plural types of information recording media.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical head comprising:
    at least one light source for emitting beams with a plurality of wavelengths;
    a photodetector, and
    at least one diffractive optical element provided in an optical path common to the beams with different wavelengths,
    wherein a first diffraction light and a second diffraction light are substantially different in diffraction order and are emitted from the at least one diffraction optical element with respect to the beams with a plurality of wavelengths, wherein the diffraction orders of both the first diffraction light and the second diffraction light is not zero and wherein the diffraction order of the diffraction light with a longer wavelength is smaller than the diffraction order of the diffraction light with a shorter wavelength.

2. The optical head of claim 1, wherein the plurality of wavelengths comprises a first wavelength and a second wavelength that is approximately twice as long as the first wavelength;
    wherein the first diffraction light is substantially a second-order diffraction light with respect to the beam with the first wavelength and the second diffraction light is substantially a first-order diffraction light with respect to the beam with the second wavelength.

3. The optical head according to claim 2, wherein said at least one diffractive optical element has a cross section substantially of a sawtooth shape, and with respect to the first wavelength $\lambda_1$, the second wavelength $\lambda_2$, and a refractive index n of a material of said at least one diffractive optical element, groove depth in the sawtooth shape is substantially in a range between $2\lambda_1/(n-1)$ and $\lambda_2/(n-1)$ in the case of a transmission element, is substantially in a range between $\lambda_1/n$ and $\lambda_2/2n$ in the case of a reflection element onto which beams are incident from a substrate side, and is substantially in a range between $\lambda_1$ and $\lambda_2/2$ in the case of a reflection element onto which beams are incident from an air side.

4. The optical head according to claim 2, wherein said at least one diffractive optical element is an objective lens for focusing beams on an information recording medium.

5. The optical head according to claim 2, wherein said at least one diffractive optical element is a collimator lens for collimating beams emitted from said at least one light source substantially into parallel beams.

6. The optical head according to claim 2, wherein said at least one diffractive optical element is a focusing/tracking error signal detection element.

7. The optical head according to claim 2, wherein with respect to the first wavelength $\lambda_1$, a minimum period $\Lambda_{min}$ of said at least one diffractive optical element satisfies a relationship of $\Lambda_{min} \geq 10\lambda_1$.

8. The optical head according to claim 2, wherein with respect to the first wavelength $\lambda_1$, a minimum period $\Lambda_{min}$ of the diffractive optical element satisfies a relationship of $\Lambda_{min} \geq 22\lambda_1$.

9. The optical head according to claim 2, wherein the optical head further comprises a refraction optical element having optical surfaces onto which beams emitted from said at least one light source are incident obliquely, the refraction optical element is provided in optical paths of the beams with the first and the second wavelengths, and a diffraction angle of light diffracted by said at least one diffractive optical element due to variation in wavelength of the beams emitted from said at least one light source and a refraction angle of light refracted by the refraction optical element are changed in directions that enable the beams to be canceled out with each other.

10. The optical head according to claim 9, wherein said at least one diffractive optical element is a grating with a uniform period.

11. The optical head according to claim 9, wherein said at least one diffractive optical element is positioned in a converging light optical path or a diverging light optical path with a numerical aperture of 0.39 or less, and said at least one diffractive optical element has a uniform period.

12. The optical head according to claim 9, wherein the refraction optical element is a prism with three optical surfaces, and when in the three optical surfaces, a surface on a side of an information recording medium is a first surface, a surface on a side of said at least one light source is a second surface, and a surface other than those is a third surface, the refraction optical element is designed so that the beams emitted from said at least one light source pass through the second surface, are reflected by the first and the third surfaces sequentially, and then pass through the first surface, and a bottom part of an objective lens is located lower than a highest position of the beams entering the second surface that have been emitted from said at least one light source.

13. The optical head according to claim 12, wherein a glass material of the prism has an Abbe number of at least 64.

14. The optical head according to claim 2, wherein said light source is an SHG light source that emits beams with two wavelengths.

15. The optical head according to claim 2, wherein the optical head further comprises a transparent substrate in which the beams with the first and the second wavelengths propagate in a zigzag manner, and said at least one diffractive optical element is positioned on the transparent substrate.

16. The optical head according to claim 2, wherein the first wavelength $\lambda_1$ satisfies a relationship of 0.35 $\mu m \leq \lambda_1 \leq 0.44$ $\mu m$ or the second wavelength $\lambda_2$ satisfies a relationship of 0.76 $\mu m \leq \lambda_2 \leq 0.88$ $\mu m$.

17. The optical head according to claim 2, wherein the first wavelength $\lambda_1$ satisfies substantially a relationship of 0.35 $\mu m \leq \lambda_1 \leq 0.44$ $\mu m$, and said at least one diffractive optical element is a chromatic-aberration compensation element for compensating chromatic aberration caused by an objective lens for focusing beams on an information recording medium.

18. The optical head of claim 1, further comprising an objective lens for focusing beams on an information recording medium; and
wherein the plurality of wavelengths comprises a first wavelength and a second wavelength that is approximately twice as long as the first wavelength;
wherein the diffractive optical element is a chromatic-aberration compensation element that compensates chromatic aberration caused by the objective lens and that has difference in level of a step-like shape or grooves substantially of a sawtooth shape, and with respect to the first wavelength $\lambda_1$, the second wavelength $\lambda_2$, and a refractive index n of a material of the chromatic-aberration compensation element, the difference in level or depth of the grooves is in a range substantially between $2\lambda_1/(n-1)$ and $\lambda_2/(n-1)$.

19. The optical head according to claim 18, wherein the first wavelength $\lambda_1$ satisfies a relationship of 0.35 $\mu m \leq \lambda_1 \leq 0.44$ $\mu m$ or the second wavelength $\lambda_2$ satisfies a relationship of 0.76 $\mu m \leq \lambda_2 \leq 0.88$ $\mu m$.

20. The optical head according to claim 18, wherein the chromatic-aberration compensation element is formed on the objective lens.

21. The optical head according to claim 18, wherein the chromatic-aberration compensation element and the objective lens are driven together by an actuator.

22. The optical head according to claim 18, wherein the chromatic-aberration compensation element is a convex diffractive lens and forms converging light in cooperation with the objective lens.

23. The optical head of claim 1, wherein the plurality of wavelengths comprises a first wavelength, a second wavelength that is approximately twice as long as the first wavelength, and a third wavelength that is approximately 1.5 times as long as the first wavelength;
wherein the first diffraction light is substantially a fourth-order diffraction light with respect to the beam with the first wavelength, the second diffraction light is substantially a second-order diffraction light with respect to the beam with the second wavelength, and a third diffraction light is substantially a third-order diffraction light with respect to the beam with the third wavelength.

24. The optical head according to claim 23, wherein said at least one diffractive optical element has a cross section substantially of a sawtooth shape, and with respect to the first wavelength $\lambda_1$, the second wavelength $\lambda_2$, the third wavelength $\lambda_3$, and a refractive index n of a material of said at least one diffractive optical element, groove depth in the sawtooth shape is substantially in a range between a minimum and a maximum among $4\lambda_1/(n-1)$, $2\lambda_2/(n-1)$, and $3\lambda_3/(n-1)$ in the case of a transmission element, is substantially in a range between a minimum and a maximum among $2\lambda_1/n$, $\lambda_2/n$, and $3\lambda_3/2n$ in the case of a reflection element onto which beams are incident from a substrate side, and is substantially in a range between a minimum and a maximum among $2\lambda_1$, $\lambda_2$, and $3\lambda_3/2$ in the case of a reflection element onto which beams are incident from an air side.

25. The optical head according to claim 23, wherein with respect to the first wavelength $\lambda_1$, a minimum period $\Lambda_{min}$ of said at least one diffractive optical element satisfies a relationship of $\Lambda_{min} \geq 22\lambda_1$.

26. The optical head according to claim 23, wherein the first wavelength $\lambda_1$ satisfies a relationship of 0.35 $\mu m \leq \lambda_1 \leq 0.44$ $\mu m$, the second wavelength $\lambda_2$ satisfies a relationship of 0.76 $\mu m \leq \lambda_2 \leq 0.88$ $\mu m$, or the third wavelength $\lambda_3$ satisfies a relationship of 0.57 $\mu m \leq \lambda_3 \leq 0.68$ $\mu m$.

27. The optical head according to claim 23, wherein the first wavelength $\lambda_1$ satisfies substantially a relationship of 0.35 $\mu m \leq \lambda_1 \leq 0.44$ $\mu m$, and said at least one diffractive optical element is a chromatic-aberration compensation element for compensating chromatic aberration caused by an objective lens for focusing beams on an information recording medium.

28. The optical head of claim 1, further comprising an objective lens for focusing beams on an information recording medium; and wherein the plurality of wavelengths comprises a first wavelength a second wavelength that is approximately twice as long as the first wavelength, and a third wavelength that is approximately 1.5 times as long as the first wavelength;

wherein said at least one diffractive optical element is a chromatic-aberration compensation element that compensates chromatic aberration caused by the objective lens and has difference in level of a step-like shape or grooves substantially of a sawtooth shape, and with respect to the first wavelength $\lambda_1$, the second wavelength $\lambda_2$, the third wavelength $\lambda_3$, and a refractive index n of a material of said at least one diffractive optical element, the difference in level or depth of the grooves is in a range between a minimum and a maximum among $4\lambda_1/(n-1)$, $2\lambda_2/(n-1)$, and $3\lambda_3/(n-1)$.

29. The optical head according to claim 28, wherein the first wavelength $\lambda_1$ satisfies a relationship of 0.35 $\mu m \leq \lambda_1 \lambda 0.44$ $\mu m$, the second wavelength $\lambda_2$ satisfies a relationship of 0.76 $\mu m \leq \lambda_2 \leq 0.88$ $\mu m$, or the third wavelength $\lambda_3$ satisfies a relationship of 0.57 $\mu m \leq \lambda_3 \leq 0.68$ $\mu m$.

30. The optical head according to claim 28, wherein the chromatic-aberration compensation element is formed on the objective lens.

31. The optical head according to claim 28, wherein the chromatic-aberration compensation element and the objective lens are driven together by an actuator.

32. The optical head according to claim 28, wherein the chromatic-aberration compensation element is a convex diffractive lens and forms converging light in cooperation with the objective lens.

33. The optical head of claim 1, wherein the plurality of wavelengths comprises a first wavelength and a second wavelength that is approximately 1.5 times as long as the first wavelength;

wherein the first diffraction light is substantially a third-order diffraction light with respect to the beam with the first wavelength and the second diffraction light is substantially a second-order diffraction light with respect to the beam with the second wavelength.

34. The optical head according to claim 33, wherein said at least one diffractive optical element has a cross section substantially of a sawtooth shape, and with respect to the first wavelength $\lambda 1$, the second wavelength $\lambda_2$, and a refractive index n of a material of said at least one diffractive optical element, groove depth in the sawtooth shape is substantially in a range between $3\lambda_1/(n-1)$ and $2\lambda_2/(n-1)$ in the case of a transmission element, is substantially in a range between $3\lambda 1/2n$ and $\lambda_2/n$ in the case of a reflection element onto which beams are incident from a substrate side, and is substantially in a range between $3\lambda_1/2$ and $\lambda_2$ in the case of a reflection element onto which beams are incident from an air side.

35. The optical head according to claim 33, wherein with respect to the first wavelength $\lambda_1$, a minimum period $\Lambda_{min}$ of said at least one diffractive optical element satisfies a relationship of $\Lambda_{min} \geq 16\lambda_1$.

36. The optical head according to claim 33, wherein the first wavelength $\lambda_1$ satisfies a relationship of 0.35 $\mu m \leq \lambda_1 \leq 0.44$ $\mu m$ or the second wavelength $\lambda_2$ satisfies a relationship of 0.57 $\mu m \leq \lambda_2 \leq 0.68$ $\mu m$.

37. The optical head according to claim 33, wherein the first wavelength $\lambda_1$ satisfies substantially a relationship of 0.35 $\mu m \leq \lambda_1 \leq 0.44$ $\mu m$, and said at least one diffractive optical element is a chromatic-aberration compensation element for compensating chromatic aberration caused by an objective lens for focusing beams on an information recording medium.

38. The optical head of claim 1, further comprising an objective lens for focusing beams on an information recording medium; and wherein the plurality of wavelengths comprises a first wavelength and a beam with a second wavelength that is approximately 1.5 times as long as the first wavelength;

wherein the diffractive optical element is a chromatic-aberration compensation element that compensates chromatic aberration caused by the objective lens and that has difference in level of a step-like shape or grooves substantially of a sawtooth shape, and with respect to the first wavelength $\lambda_1$, the second wavelength $\lambda_2$, and a refractive index n of a material of the chromatic-aberration compensation element, the difference in level or depth of the grooves is substantially in a range between $3\lambda_1/(n-1)$ and $2\lambda_2/(n-1)$.

39. The optical head according to claim 38, wherein the first wavelength $\lambda_1$ satisfies a relationship of 0.35 $\mu m \leq \lambda_1 \leq 0.44$ $\mu m$ or the second wavelength $\lambda_2$ satisfies a relationship of 0.57 $\mu m \leq \lambda_2 \leq 0.68$ $\mu m$.

40. The optical head according to claim 38, wherein the chromatic-aberration compensation element is formed on the objective lens.

41. The optical head according to claim 38, wherein the chromatic-aberration compensation element and the objective lens are driven together by an actuator.

42. The optical head according to claim 38, wherein the chromatic-aberration compensation element is a convex diffractive lens and forms converging light in cooperation with the objective lens.

43. The optical head of claim 1, wherein the plurality of wavelengths comprises a first wavelength, a second wavelength that is approximately twice as long as the first wavelength, and a third wavelength that is approximately 1.5 times as long as the first wavelength;

wherein the first diffraction light is substantially a sixth-order diffraction light with respect to the beam with the first wavelength, the second diffraction light is substantially a third-order diffraction light with respect to the beam with the second wavelength, and the third diffraction light is substantially a fourth-order diffraction light with respect to the beam with the third wavelength.

44. The optical head according to claim 43, wherein said at least one diffractive optical element has a cross section substantially of a sawtooth shape, and with respect to the first wavelength $\lambda_1$, the second wavelength $\lambda_2$, the third wavelength $\lambda_3$, and a refractive index n of a material of said at least one diffractive optical element, groove depth in the sawtooth shape is substantially in a range between a minimum and a maximum among $6\lambda_1/(n-1)$, $3\lambda_2/(n-1)$, and $4\lambda_3/(n-1)$ in the case of a transmission element, is substantially in a range between a minimum and a maximum among $3\lambda_1/n$, $3\lambda_2/2n$, and $2\lambda_3/n$ in the case of a reflection element onto which beams are incident from a substrate side, and is substantially in a range between a minimum and a maximum among $3\lambda_1$, $3\lambda_2/2$, and $2\lambda_3$ in the case of a reflection element onto which beams are incident from an air side.

45. The optical head of claim 1, further comprising an objective lens for focusing beams on an information recording medium; and wherein the plurality of wavelengths comprises a first wavelength a second wavelength that is approximately twice as long as the first wavelength, and a third wavelength that is approximately 1.5 times as long as the first wavelength;

wherein said at least one diffractive optical element is a chromatic-aberration compensation element that compensates chromatic aberration caused by the objective lens and that has difference in level of a step-like shape or grooves substantially of a sawtooth shape, and with respect to the first wavelength $\lambda_1$, the second wavelength $\lambda_2$, the third wavelength $\lambda_3$, and a refractive index n of a material of said at least one diffractive optical element, the difference in level or depth of the grooves is substantially in a range between a minimum and a maximum among $6\lambda_1/(n-1)$, $3\lambda_2/(n-1)$, and $4\lambda_3/(n-1)$.

46. The optical head according to claim 45, wherein the chromatic-aberration compensation element is formed on the objective lens.

47. The optical head according to claim 45, wherein the chromatic-aberration compensation element and the objective lens are driven together by an actuator.

48. The optical head according to claim 45, wherein the chromatic-aberration compensation element is a convex diffractive lens and forms converging light in cooperation with the objective lens.

49. The optical head of claim 1, wherein the plurality of wavelengths comprises a wavelength $\lambda$ that satisfies substantially a relationship of $0.35 \mu m \leq \lambda \leq 0.44 \mu m$;

wherein said at least one diffractive optical element is a chromatic-aberration compensation element for compensating chromatic aberration caused by an objective lens for focusing beams on an information recording medium.

50. The optical head according to claim 49, wherein the chromatic-aberration compensation element is formed on the objective lens.

51. The optical head according to claim 49, wherein the chromatic-aberration compensation element and the objective lens are driven together by an actuator.

52. The optical head according to claim 49, wherein the chromatic-aberration compensation element is a convex diffractive lens and forms converging light in cooperation with the objective lens.

* * * * *

UNITED STATES PATENT AND TRADEMARK OFFICE
CERTIFICATE OF CORRECTION

PATENT NO. : 6,834,036 B1
DATED : December 21, 2004
INVENTOR(S) : Teruhiro Shiono et al.

It is certified that error appears in the above-identified patent and that said Letters Patent is hereby corrected as shown below:

Column 35,
Lines 1-2, please insert -- , -- after "a first wavelength".
Lines 17-18, change "$0.35\mu m \leq \lambda_1 \lambda\ 0.44 \mu m$" to -- $0.35\mu m \leq \lambda_1 \leq 0.44 \mu m$ --.
Line 43 change "$\lambda 1$" to -- $\lambda_1$ --.
Line 48, change "$3\lambda 1/2n$" to -- $3\lambda_1/2n$ --.

Column 36,
Lines 63-64, please insert -- , -- after "a first wavelength".

Signed and Sealed this

Seventeenth Day of May, 2005

JON W. DUDAS
*Director of the United States Patent and Trademark Office*